United States Patent
Tsutsui et al.

(10) Patent No.: US 11,974,078 B2
(45) Date of Patent: Apr. 30, 2024

(54) DIGITAL SIGNAGE BY OPTICAL COMMUNICATION AND SUPPLEMENTAL DOWNLINK DEVICE AND METHOD USING LED ILLUMINATION

(71) Applicant: SoftBank Corp., Tokyo (JP)

(72) Inventors: Takashi Tsutsui, Tokyo (JP); Kazuhiko Goukon, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/173,777

(22) Filed: Feb. 23, 2023

(65) Prior Publication Data

US 2023/0199158 A1 Jun. 22, 2023

Related U.S. Application Data

(63) Continuation of application No. PCT/JP2021/030864, filed on Aug. 23, 2021.

(30) Foreign Application Priority Data

Aug. 24, 2020 (JP) ................. 2020-141107

(51) Int. Cl.
*H04N 9/31* (2006.01)
*G03B 13/36* (2021.01)
(Continued)

(52) U.S. Cl.
CPC .......... *H04N 9/3185* (2013.01); *G03B 13/36* (2013.01); *G06F 11/08* (2013.01); *H04N 9/317* (2013.01); *H04N 9/3194* (2013.01); *H04N 23/69* (2023.01)

(58) Field of Classification Search
CPC .. H04N 9/3147; H04N 9/3185; H04N 9/3182; H04N 21/4425; H04N 21/436;
(Continued)

(56) References Cited

U.S. PATENT DOCUMENTS

2006/0239675 A1 10/2006 Iizuka
2013/0271508 A1 10/2013 Kaneko
2023/0071454 A1 3/2023 Tsutsui

FOREIGN PATENT DOCUMENTS

JP 2013009072 A 1/2013
JP 2013236363 A 11/2013
(Continued)

OTHER PUBLICATIONS

International Search Report and (ISA/237) Written Opinion of the International Search Authority for International Patent Application No. PCT/JP2021/030864, mailed by the Japan Patent Office dated Nov. 16, 2021.

*Primary Examiner* — Ryan D Howard

(57) ABSTRACT

In the present application, for a detailed protocol for realizing supplemental downlink communication in the filed patent, particularly, a system is proposed which performs training processing at high speed by using two-dimensionally developed information. In the present application, compared to the filed patent, a two-dimensional pilot symbol can be used in a display unit, further, introduction of a segment for communication band control using a two-dimensional pilot symbol, training processing using a two-dimensional test pattern for establishing a communication path, and a configuration of a communication frame are clarified, and MIMO processing of communication using video information by a plurality of segments is realized to improve a throughput of an existing portable phone.

17 Claims, 23 Drawing Sheets

(EXAMPLE OF COMMUNICATION SYSTEM CONFIGURATION)

(51) Int. Cl.
*G06F 11/08* (2006.01)
*H04N 23/69* (2023.01)

(58) Field of Classification Search
CPC .... H04N 21/431; H04N 21/234; H04N 21/23; G06F 11/08
See application file for complete search history.

(56) References Cited

FOREIGN PATENT DOCUMENTS

| | | |
|---|---|---|
| JP | 2019220966 A | 12/2019 |
| WO | 2005117304 A1 | 12/2005 |
| WO | 2019150489 A1 | 8/2019 |

(USE SCENE IMAGE 1)

(ALL PROCESSING STATES)

DIGITAL SIGNAGE BY OPTICAL COMMUNICATION AND SUPPLEMENTAL DOWNLINK DEVICE AND METHOD USING LED ILLUMINATION

The contents of the following Japanese patent application(s) are incorporated herein by reference:
NO. 2020-141107 filed in JP on Aug. 24, 2020
NO. PCT/JP2021/030864 filed in WO on Aug. 23, 2021

BACKGROUND

1. Technical Field

The present invention relates to a communication system, a display control device, a communication terminal, and a program.

2. Related Art

In a supplemental downlink communication system using optical communication in a filed patent (application number: PCT/JP2018/003220), a communication system is described which performs communication by displaying image information on a projector installed outdoors, a wall surface of a building, or the like. The present application proposes a detailed protocol for realizing the filed patent and use of a two-dimensional image pattern for realizing high-speed processing.

PRIOR ART DOCUMENTS

Patent Document

Patent Document 1: PCT/JP2018/003220

SUMMARY

Technical Problem

In the present embodiment, in order to quickly establish communication which is not clearly described in the filed patent (application No.: PCT/JP2018/003220), with respect to the filed patent, a two-dimensional pilot symbol using a two-dimensional bar code using a space or a digital watermark is further used for the display unit, and further a test pattern is also formed into a two-dimensional pattern and spread in the space, or introduction of a segment in which pixels are bundled as a communication path, a configuration of a frame thereof, a two-dimensional pilot symbol, an adaptation method of pixels, and how to use the segment when there is a moving obstacle such as a person in the surroundings are clarified, so that communication can be quickly started even in a moving terminal, and multiple input multiple output (MIMO) processing in the display unit and by a plurality of display units is realized.

Technical Solution

Description of Previous Patent

According to a first aspect of the present invention, a communication system is provided in which a means for solving the above problem is added to the communication system according to claim 1 of the previous patent (application number: PCT/JP2018/003220) (the communication system including: a display control device configured to cause a display unit to display a video; and a communication terminal which has an imaging unit configured to capture the video displayed by the display unit, wherein the display control device includes: a video acquisition unit configured to acquire a video to be displayed; a region specification unit configured to specify a region which does not change or a region in which a change amount is lower than a predetermined threshold value in the video acquired by the video acquisition unit; a video generation unit configured to generate an encoded video obtained by encoding transmission data as an optical communication signal in the region specified by the region specification unit; and a display control unit configured to cause the display unit to display the encoded video, the communication terminal includes: a region identification unit configured to identify a region in which the transmission data is encoded in the video captured by the imaging unit; and a decoding unit configured to decode the transmission data from the region identified by the region identification unit, and a supplemental downlink by optical communication is provided which has a mechanism for exchanging a communication control signal of the optical communication by using a wireless communication means (WiFi, 3G, 4G, 5G, or the like) other than the optical communication)).

Summary of the Present Patent

As in the case of the previous patent (application number: PCT/JP2018/003220), claim 1 of the present invention is a system including: as a display unit configured to display a video, a display including a plurality of pixels using visible light configuring a digital image and/or invisible light in a far infrared region and/or a display unit including a plurality of pixels projecting the digital image; a display control device configured to control the display unit configured to control the display; a communication terminal which includes an imaging unit configured to capture the video displayed by the display unit and a communication means with the display control unit; and an image processing server which has an image processing function of receiving captured image data from the communication terminal and performing image processing, and the present invention is characterized in that a processing time is shortened by training processing using the two-dimensional image of claim 4, and the image processing server according to claim 9 in addition to the communication terminal is used for image processing, so that complex processing can be performed. In addition, it is also possible to use the single light source illumination of claim 12, a plurality of single light source illuminations and a plurality of display units of claim 13 can be controlled by one display control device, and it is possible to perform supplemental downlink communication by using a plurality of optical communication links. When invisible light is used, unlike visible light, it is not necessary to consider video information, and it is possible to further realize one million times efficiency from wavelength characteristics.

Use of Segment

When the display unit is used, a resolution which can be resolved by the communication terminal varies depending on the communication environment. For example, there is a possibility that information cannot be sent and received in units of one pixel. Therefore, in the present invention, processing is performed in units of segments in which pixels are collected. That is, information is sent to the communication terminal in units of segments. The shape of the segment may be a rectangle, a circle, or another shape as long as all pixels in the segment have the same hue and luminance at the time of communication. By using this segment, even in a poor communication environment, that is, in a state of low resolution, communication can be performed by using a segment in which many pixels are collected. The single light source illumination can be considered as a display unit having one pixel, and it is considered that there is only one segment and the segment includes one pixel.

Processing State

In order to establish communication, there are included a training processing state in which selection and adaptation of a segment of the display unit usable for communication between the display unit and the communication terminal are executed according to a communication status, a communication processing state in which communication is performed on the basis of a training result of the training processing state, and an error detection processing state in which an error of communication data of the communication processing state is detected. When a communication error is detected in the error detection processing state, the processing returns to the training processing state again, and the optimum resolution and the optimum segment to be used are cyclically selected. In a communication cycle including three states of the training processing state, the communication processing state, and the error detection processing state, the readaptation of claim 11 based on the selection of the optimal segment and the decision of the optimal resolution is always enabled by the training processing state.

Description of Means Used in Each State

In order to realize the above three states, the display control device has a first means for displaying, on the display unit, identification information for the communication terminal to recognize the display unit and for deciding a necessary resolution in addition to video information, a second means for displaying, on the display unit, control information for selecting an optimum segment to be used for communication from the display unit to the communication terminal in the display unit and for deciding the resolution in addition to the video information, and a third means for displaying, on the display unit, data information to be used for communication from the display unit to the communication terminal in addition to the video information First Means The first means is for the communication terminal to identify which company, which base station, and which display unit is used, and has a company ID for identifying a company, a base station ID for identifying a base station, and a screen ID for identifying the display unit. The communication terminal which has identified the information of the first means enters the first training on the basis of the information. There are two options for this first means. In the first option, a two-dimensional code of claim 2, such as a QR code (registered trademark), in which information is two-dimensionally spread in a space, is used, which is effective for reducing processing time. This two-dimensional code is referred to as a two-dimensional pilot symbol. In the second option, a bit stream using the time axis illustrated in claim 3 in which each piece of information is sent as a bit string to a segment including a single or a plurality of pixels is used without using the two-dimensional code. This bit stream may be superimposed on the video information. When the two-dimensional pilot symbol is used, the information is spread in the space, and thus the processing time can be shortened, which is particularly effective for mobile communication. In the method using the time axis, the processing time becomes longer depending on the frame length and the frame interval of the bit stream, but since each segment has information, it is possible to more accurately select the segment and detect the resolution. The single light source illumination can be considered as a display unit having only one pixel, the first two-dimensional code cannot be used, and only the first option is available.

First Means, Use of Two-dimensional Pilot Symbol

When the two-dimensional pilot symbol using the two-dimensional code is used, the communication terminal sends the imaging result to the image processing server by using an existing wireless communication means (WiFi, 3G, 4G, 5G, or the like), and the image processing server reads the two-dimensional pilot symbol from the image, and reads the company ID for identifying the company, the base station ID for identifying the base station, and the screen ID for identifying the display unit. In addition, when a plurality of two-dimensional pilot symbols is used, a two-dimensional pilot symbol ID for identifying each two-dimensional pilot symbol is also included in the two-dimensional code, and this information is also read in by the communication terminal to be sent to the image processing server. The arrangement of the plurality of two-dimensional pilot symbols at predetermined positions is used as the two-dimensional pilot symbol, and this arrangement is set as a two-dimensional pilot symbol map. When two-dimensional pilot symbol maps having a plurality of different arrangements are used, the two-dimensional pilot map ID used is also added to the two-dimensional pilot symbol, and the position of the two-dimensional pilot symbol read from the two-dimensional pilot map ID and the two-dimensional pilot symbol ID is decided. This processing is executed by the image processing server, but may be executed in the communication terminal without using the image processing server, and the result may be sent to the display control device or the BBU by the existing wireless communication means (WiFi, 3G, 4G, 5G, or the like). This two-dimensional pilot symbol may be sent only at a specific time except a case where the two-dimensional pilot symbol is displayed at all times, and in this case, the two-dimensional pilot symbol can be used as a reference time for time synchronization. For this purpose, time may be embedded in the two-dimensional pilot symbol. In addition, in addition to the case of using a binary code in which only black and white are used as the two-dimensional code with the maximum luminance and the minimum luminance, a multi-valued code based on hue and luminance can be used by using RGB. When the image processing server is used, the information of the read two-dimensional pilot symbol is reported to the display processing device via the communication terminal, but may be directly sent from the communication processing server to the display processing device.

First Means, Training using Two-dimensional Pilot Symbol

In an example of the first option of claim 9 using the two-dimensional code in the training by the first means, in order to decide an optimal segment size of the two-dimensional pilot symbol, the display control device starts with a large segment size, performs training processing using the two-dimensional pilot symbol having a smaller size when the communication terminal can recognize, and decides the optimal size of the two-dimensional pilot symbol. The communication terminal sends the imaging result to the image processing server by using the existing wireless communication means (WiFi, 3G, 4G, 5G, or the like), the image processing server reads the two-dimensional pilot symbol from the image, decides the optimum resolution, and reports the optimum resolution to the display control device, and the display control device changes the segment size on the basis of the report and performs training again. In this report, all the processing may be performed in the communication terminal without using the image processing server, and the report may be performed by the existing wireless communication means (WiFi, 3G, 4G, 5G, or the like). When this training is performed, the segment size to be used first may be empirically decided from the segment size in a case where communication is successful, and AI can also be used.

Processing in Communication Terminal, First Option of First Means

In the first option of this first means, the communication terminal performs automatic AF-focusing processing on the captured image of the display unit and sends the result to the image processing server by using another wireless communication means (WiFi, 3G, 4G, 5G, or the like) for processing. The image processing server performs zoom processing, a distortion correction function, and a normal image/mirror image detection function on the image sent from the communication terminal. This processing may be performed by the communication terminal. Thereafter, the image processing server performs decoding processing on the two-dimensional pilot symbol, and when the two-dimensional pilot symbol is detected only at a specific time, performs synchronization processing and decoding processing, and as a result reports a fact, which indicates whether the two-dimensional pilot symbol has been received, to the communication control device or the BBU. If it is reported that the two-dimensional pilot symbol has not been received normally, the display processing device increases the size of the segment until the communication terminal can perform decoding normally, and performs the processing again. When the normal reception is reported, the display control device proceeds to the second means. In this case, the two-dimensional code spread in the space is used, and thus the processing time is considerably short. In addition, distortion can be corrected by the two-dimensional code. For example, when reading is performed a plurality of times while changing an axis serving as a reference for reading an image, distortion of the image can be recognized and correction can be performed. Processing such as affine transformation may be performed on the basis of the result.

First Means, Training When Two-dimensional Pilot Symbol is Not Used

In an example of the second option of claim 10 using the time axis of the first means, in all the pixels in the segment of the display unit, for synchronization and identification of the company ID, the base station ID, and the screen ID, the frame type for identifying the preamble and the first means, the frame length indicating the length of the bit stream, the segment ID indicating the position of the segment, the resolution index indicating the size of the segment, and the error detection code for error detection of the control information are sent as a control frame including a serial bit string to the display unit. The display control device may superimpose the control frame on the video information, display the control frame only at a specific time, and send the video information at other times. The communication terminal sends an imaging result to the image processing server by using the existing wireless communication means (WiFi, 3G, 4G, 5G, or the like), the image processing server reads, from the image, the company ID for identifying a company, the base station ID for identifying a base station, the screen ID for identifying a display unit, and the resolution index, and when no error is detected and a plurality of the same segment IDs can be detected, the image processing server decides whether a smaller segment size can be used and reports the result to the display control device or the BBU, and the display control device changes the segment size on the basis of the report and performs training again. In this report, all the processing may be performed in the communication terminal without using the image processing server, and the report may be performed by the existing wireless communication means (WiFi, 3G, 4G, 5G, or the like). When this training is performed, the segment size to be used first may be empirically decided from the segment size in a case where communication has succeeded. In this case, synchronization can be performed by the preamble of the control frame, and the start of the frame can be used as the reference time of the synchronization. In addition, AI may be used to decide the segment size.

Processing in Communication Terminal, Second Option of First Means

In the second option of the first means, the communication terminal performs automatic AF-focusing processing on the captured image of the display unit, performs decoding processing of the control frame, and sends the result to the display control device or the BBU by another wireless communication means (WiFi, 3G, 4G, 5G, or the like). When the decoding is not normally performed, the display processing device increases the size of the segment until the communication terminal can perform decoding normally, and performs the processing again. When the normal reception is reported, the display control device proceeds to the second means. The single light source illumination can be considered as a display unit having only one pixel, and the two-dimensional code of the first option cannot be used, and this second option cannot be used. In addition, AI may be used to decide the segment size.

Second Means

On the basis of the result of the training of the first means, in the second means, test information for deciding how to optimally select the segment size and the segment of the display unit for communication is sent to the communication terminal, and as a result, a more appropriate resolution for communication is decided. The shape of the segment may be rectangular, circular, or other shapes. There are three options for this second means.

Second Means, First Option

In an example of the first option of the second means described in claim 14, when the resolution and the segment size can be obviously decided from the training result using the first means, the second means may be simplified, and the state may be shifted to the communication state by the next third means. For example, in a case where all two-dimensional pilot symbols in the two-dimensional pilot map can be detected, it is assumed that all the segments can be used, and the segment size decided by the first means may be used in communication. Alternatively, for example, in a case where only one two-dimensional pilot symbol can be detected, only in the vicinity of the two-dimensional pilot symbol, the segment size in which the two-dimensional pilot symbol can be detected may be used. That is, the resolution decided by the first means is used by the third means. In this case, since only the information completely spread in the space is used, the training processing can be ended in the shortest time. In this option, in order to perform the training processing in the minimum time, a bit error is measured only in the communication state. Therefore, the use of the multi-value signal is decided by the communication state. In this case, it is necessary to have segment information used for communication between the display control device and the communication terminal, and it is necessary to define the vicinity of the two-dimensional pilot symbol usable for communication. As an example, information related to a predetermined shape/size of the vicinity may be included in the control information. The size of the vicinity may be empirically decided from the segment size in a case where communication is successful. In addition, AI can also be used.

Processing in Communication Terminal, First Option of Second Means

In the first option of this second means, the communication terminal sends, to the display control device, the list of the two-dimensional pilot symbols detected in the first option of the first means by another wireless communication means (WiFi, 3G, 4G, 5G, or the like), and the display control device determines the result, decides the usable segment, and proceeds to the third means. The communication terminal continues to decode the image of the display device, and recognizes whether to proceed to another option of the second means or the third means depending on whether the test pattern can be received or the data frame can be received. In order to determine whether it is this option, the communication terminal sends the list of detected two-dimensional pilot symbols, and then continues to send the imaging result to the image processing server until entering the third means, and recognizes to perform the second option if the image processing server reports that the captured image is the test pattern. Therefore, if it is the first option, the communication terminal automatically enters the third means and quickly enters the reception of the supplemental downlink. The single light source illumination can be considered as a display unit having only one pixel, and the two-dimensional code of the first option cannot be used.

Second Means, Second Option

In an example of the second option of the second means of claim 4, the test information is sent to a block including a plurality of segments. This test information is realized by displaying, at specific time intervals, a test pattern including a digital two-dimensional image on a space including dots in which hue and luminance of pixels are changed for each segment. The time interval is set to a predetermined time, and is detected by using a reference time by the first means. A resolution and a segment that can be used between the display unit and the communication terminal are decided by the test pattern. This test pattern is superimposed on the video signal and sent as test information at a segment not used or a time not used by the first means. In this second option, the segments are identified by giving different hues and/or luminances to adjacent segments on the basis of the resolution decided by the first means. In this case, in order to identify adjacent segments, it is necessary to give at least four different pieces of information to the adjacent segments by a four-color theorem. The four different pieces of information need to be orthogonal or at least quasi-orthogonal. By using claim 5, it is possible to perform a test with a multi-value signal based on hues of RGB and luminances in one frame without using a plurality of frames. A Walsh code can be used as the orthogonal code, and for example, $$W(0,4)=1,1,1,1$$

$$W(1,4)=1,0,1,0$$

$$W(2,4)=1,1,0,-1$$

$$W(3,4)=1,0,0,1$$

are used to assign W(0,4) to W(3,4) to each segment. Herein, since W(0,4) to W(3,4) are orthogonal, it is possible to easily identify which one of the four segments is. In practice, R, G, and B take values of 0 to 255 according to the luminance when the gradation is 256, but for the sake of explanation, when G and B are set to 0 or 1, and particularly, the minimum value that can be detected as the luminance is set to 0 and the maximum value is set to 1, the first three bits can be allocated to R, G, and B, the last bit can be allocated to the luminance, four pieces of information can be sent in one frame, a 4-bit Walsh code can be allocated, and adjacent segments can be identified in the minimum time, that is, one frame of the image. In addition, when the first three bits are used for white balance for recognizing a correct color tone in order to reliably detect a hue, a correct color tone can be detected in the communication state, and a multi-value signal using the hue can also be used. For example, when R, G, and B are set to 0 to 255, orthogonal codes of 24 bits at the maximum can be used. Although the 4-bit Walsh code is used in the above example, a quasi-orthogonal code may be used when another orthogonal code or a communication environment is relatively excellent. In addition, herein, according to the four-color theorem, a description will be given by using the 4-bit Walsh code in order to identify four adjacent segments, but it is also possible to use a long code using a multi-value signal as described above so that more segments can be identified. In addition, it is possible to identify more segments by increasing the number of image frames to which the test information is sent, but it takes a processing time since the number of frames to which the test information is sent increases, and thus it is necessary to pay attention in mobile communication. In addition, in this multi-value signal, in a block including a plurality of segments, it is possible to measure a bit error rate by sending, to the display unit, a signal in which the entire block is a pseudo-random code including a multi-value signal. Based on the resolution information as the result of the first means, a block size thereof is decided by the image processing server. For example, if many segments of the display unit can be used, a short pseudo-random code may be used, and therefore a block including a small number of segments may be used. The size of this block may be a fixed number of blocks on the basis of the bit error rate to be detected.

Use of Multiple Values

Herein, for example, when is assumed that 128 gradations can be used for one segment, 8-bit allocation is possible, and sixteen segments are set as one block, so that 128-bit data can be sent. For this reason, an image frame of an image signal obtained by superimposing this information will be used for this second means. Since the time afterimage of human eyes is 50 ms to 100 ms, for example, in the case of video information of 60 fps, one image frame is 16.7 ms, so that the image frame can be used as the second means without any problem. In addition, a plurality of image frames for one second can be used as the second means by using the afterimage time of the eye. In this method, since one frame of an image is simply used as compared with a method using a stream on a time axis, the time of one cycle of processing is shortened, furthermore, a performance can be improved by using a forward error correction code (FEC) instead of an error detection code, and a compatibility with existing displays and projectors is also excellent. The error rate also can be measured by the error detection code or the forward error correction code.

Processing in Communication Terminal, Second Option of Second Means

In the second option of this second means, the communication terminal sends, to the display control device, the list of the two-dimensional pilot symbols detected in the first option of the first means by using another wireless communication means (WiFi, 3G, 4G, 5G, or the like), and the display control device decides, from the result, the size of the test pattern, that is, the block including the usable segments, maps the test pattern and the error detection or error correction code to the block, and sends the pattern to the display unit. The communication terminal sends the captured image to the image processing server, and the image processing server measures the error rate from the result and sends the result to the display control device via the communication terminal. The error rate may be sent directly to the display control device instead of via the communication terminal. Based on this error rate, the display control device determines whether the size of the segment is appropriate, and if appropriate, the processing proceeds to the third means. When the size is not appropriate, the segment size is changed, and the processing is executed again. The communication terminal continues to decode the image of the display device, and recognizes whether to proceed to another option of the second means or the third means depending on whether the test pattern can be received or the data frame can be received. The single light source illumination can be considered as a display unit having only one pixel, and the two-dimensional test pattern of the second option cannot be used.

Second Means, Third Option

In an example of the third option of the second means according to claim 6, in all the pixels in the segment, the frame type indicating the second means, the frame length indicating the length of the bit stream, the segment ID indicating the position of the segment, the resolution index indicating the size of the segment, and the error detection code for error detection of the control information are sent as a control frame including a serial bit string to the display unit. In a case where the two-dimensional pilot symbol is used in the first means, when the reference time cannot be clearly recognized, a preamble for synchronization is inserted at the beginning of the frame to perform frame synchronization. In this option, since the adjacent segments are recognized by the segment ID, the test information does not need to be orthogonal or quasi-orthogonal to the adjacent segments. Herein, the bit error rate can be measured by further adding a pseudo-random code to the frame. If the second option of the first means is used, the second option can be used as the third option of this second means.

Processing in Communication Terminal, Third Option of Second Means

In a third option of this second means, the communication terminal sends, to the display control device, the list of the two-dimensional pilot symbols detected in the first option of the first means or the list of the segments detected in the second option of the first means, and the display control device determines the result, decides the usable segments, and transmits the control frame. The communication terminal decides the error rate by the control frame and sends the error rate to the display control device. If the error rate is larger than a predetermined value, the segment to be used is changed and the control frame is sent again. If the error rate is lower than the predetermined value, the processing proceeds to the third means. The single light source illumination can be considered as a display unit having only one pixel, and only this third option is available.

Third Means

In the third means according to claim 8, in all the pixels in the segment, the frame type for identifying the third means, the frame length indicating the length of the bit stream, the sequence ID indicating the order of the data, and the data information sent by the supplemental data link, and the error detection code for error detection of the data information are sent as the data frame including the serial bit string to the display unit. Claim 7 can be used in a case where the reference time cannot be clearly recognized when the two-dimensional pilot symbol is used in the first means. In this case, a preamble for synchronization is inserted at the beginning of the frame to perform frame synchronization. The supplemental data communication is performed on the basis of the data information by the display unit and the display control unit. At this time, the bit error rate can be measured from the frame error rate, the bit error rate is estimated from the result, and the processing returns to the training processing when the bit error rate deteriorates.

Processing in Communication Terminal, Third Means

In the third means, the communication terminal captures an image displayed on the display unit and decodes the data frame. At the same time, the error rate of each segment is measured, and the result is reported to the display control device. If the error rate is higher than the predetermined threshold value, the processing returns to the first means again and the training is executed again.

Forward Error Correction by Super Frame

In addition, in the above-described communication system, it is important to reduce the error rate during communication of the supplemental data and shorten the processing time. For this reason, it is necessary to reduce a response from the communication terminal. In this error correction, it is essential to use forward error correction, which does not require a response, to the maximum extent. For this reason, the display control device includes an encoding method selection unit according to claim 17 which decides an encoding method on the basis of an error rate reported from the communication terminal by using another wireless communication means (WiFi, 3G, 4G, 5G, or the like) other than optical communication; and an encoding unit according to claim 17 which creates a super frame by a plurality of logical channel bearers including the supplemental downlink data and the forward error correction code thereof are multiplexed as a result of the selection, and a transport block to be transmitted in each segment of the display unit can be generated from the super frame based on a hash table generated on the basis of a hash function from the encoding method, and a data frame for each segment can be created. As a result, in addition to the forward error correction of a single segment, forward error correction considering a plurality of segments as one super frame can be executed, and efficient error correction which does not require a response from the communication terminal can be realized.

Single Light Source Illumination

In addition, in the communication system, the single light source illumination of claim 12 may be further used as the display unit. By using both the single light source and a display including a plurality of pixels configuring a digital image and/or a projection unit including a plurality of pixels projecting a digital image, it is possible to send a larger amount of data as a supplemental downlink to the communication terminal. Since a two-dimensional code or a two-dimensional test pattern cannot be used in this single light source, only the second option is available in the first means, and only the third option is available in the second means.

Plurality of Single Light Source Illuminations and Plurality of Display Units

In the above-described communication system, the display control device can have not only a single of single light source illumination and a single display unit but also a plurality of single light source illuminations and an interface to a plurality of display units and has a function of mapping the supplemental downlink data to the plurality of single light source illuminations and the plurality of display units and sending the data in the state of being superimposed on the video signal, and the communication terminal has a function of recognizing the screen ID sent from the display control device and can recognize and decode the data from the plurality of display units and send a larger amount of data as the supplemental downlink to the communication terminal.

Subtraction Processing of Video Data

In addition, in the communication system, it is important to more accurately and correctly extract data by the supplemental data link from the video signal in a communication path in which noise exists. For this reason, the communication terminal stores the metadata including the compression technology of the source of the video displayed on the display unit and the source data of the video, which are sent in advance by another means, and can extract, with high accuracy, only the supplemental downlink data superimposed on the video information of the display unit by performing the subtraction processing of the video data according to claim 16 on the source information of the video stored from the data obtained by capturing the video displayed on the display unit.

Data Superimposing Method (Use of Encoding Gain)

In the above-described communication system, in order to superimpose the supplemental downlink data on the image data, it is important how to superimpose the supplemental downlink data without affecting the video signal by the image data. That is, data of a large amplitude that human affects vision on the video signal cannot be superimposed on the video signal. For this reason, in claim 15, an encoding gain is used for superimposing/extracting data. That is, in the communication of the supplemental downlink data, the communication terminal and the display control device have a generation means and a decoding means of a code synchronized with a control frame and a data frame having a rate higher than the data rate of the supplemental downlink data. The display control unit has a means which spreads the data stream of the control frame and the data frame by the code generated by the code generation means and superimposes the spread data on the video signal, and in the communication terminal, the processing gain of the communication data can be obtained as the encoding gain by performing inverse spread on the basis of the code generated by the code generation means.

DESCRIPTION OF EXEMPLARY EMBODIMENTS

Hereinafter, embodiments of the present invention will be described with reference to the accompanying drawings. The invention will be described through embodiments of the invention, but the following embodiments do not limit the invention according to claims. In addition, not all of the combinations of features described in the embodiments are essential to the solving means of the invention.

Figure 1:
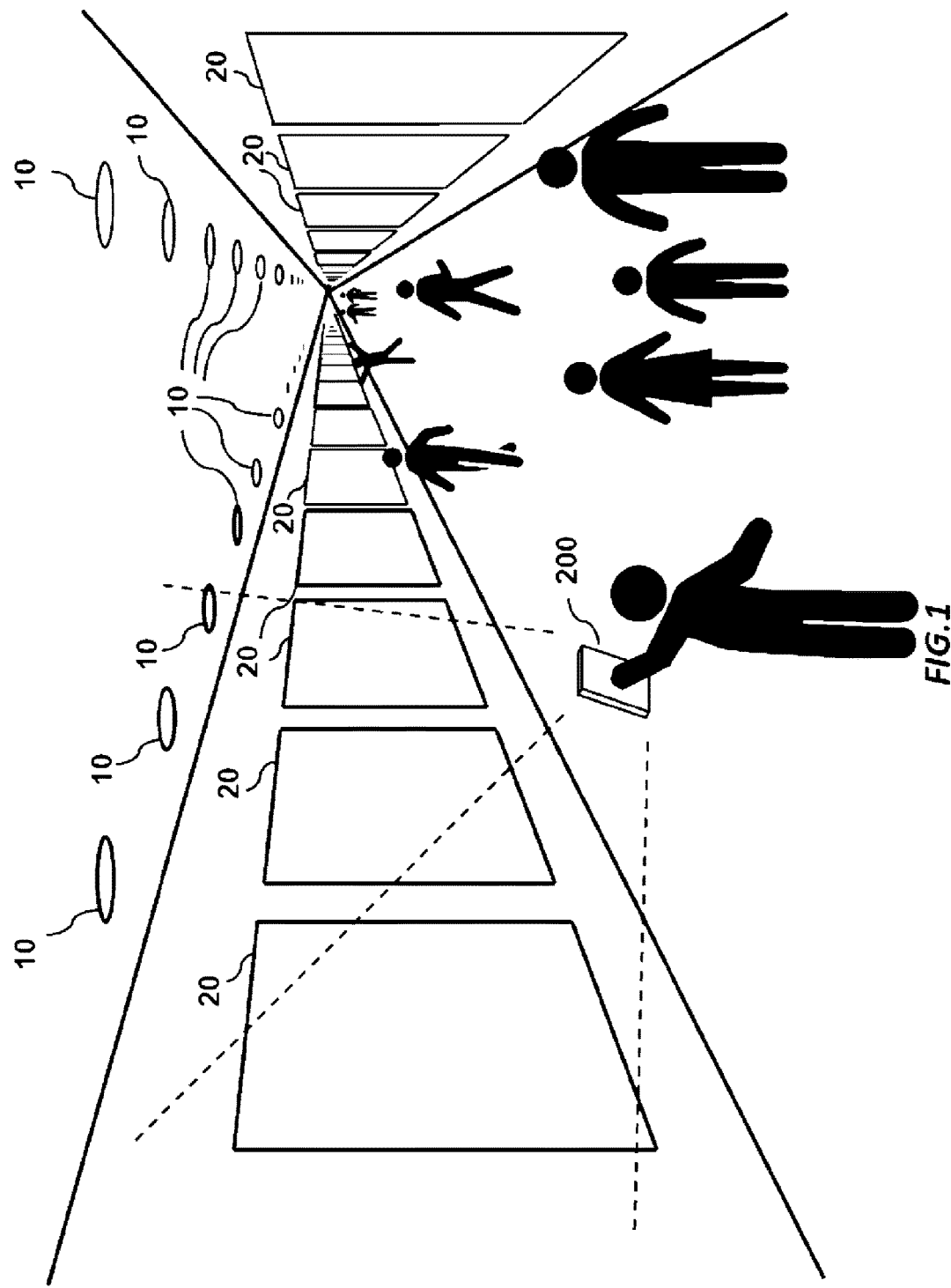
FIG. 1 is a diagram illustrating an example of an image of a use scene.

An example of a use scene will be described with reference to FIG. 1. FIG. 1 is an example of a service image using the present embodiment. In this service image, an indoor sidewalk or an underground mall is assumed. On both sides of the sidewalk, there are a plurality of digital signage screens 20 that display moving images or still images such as advertisements and news, and on the ceiling thereof, there are LED illuminations 10 of a plurality of single light sources. In the present embodiment, in order to greatly expand the performance of a portable terminal of a pedestrian in such an environment, a method and a device are provided which configure a new optical supplemental downlink 312 for increasing the throughput of a portable terminal 200 by using the plurality of digital signage screens 20 and the plurality of single light source illuminations 10 in addition to wireless technology such as WiFi, 4G, and 5G. In this system, a service with a high throughput can be provided even in a place where radio waves are weak.

Figure 2:
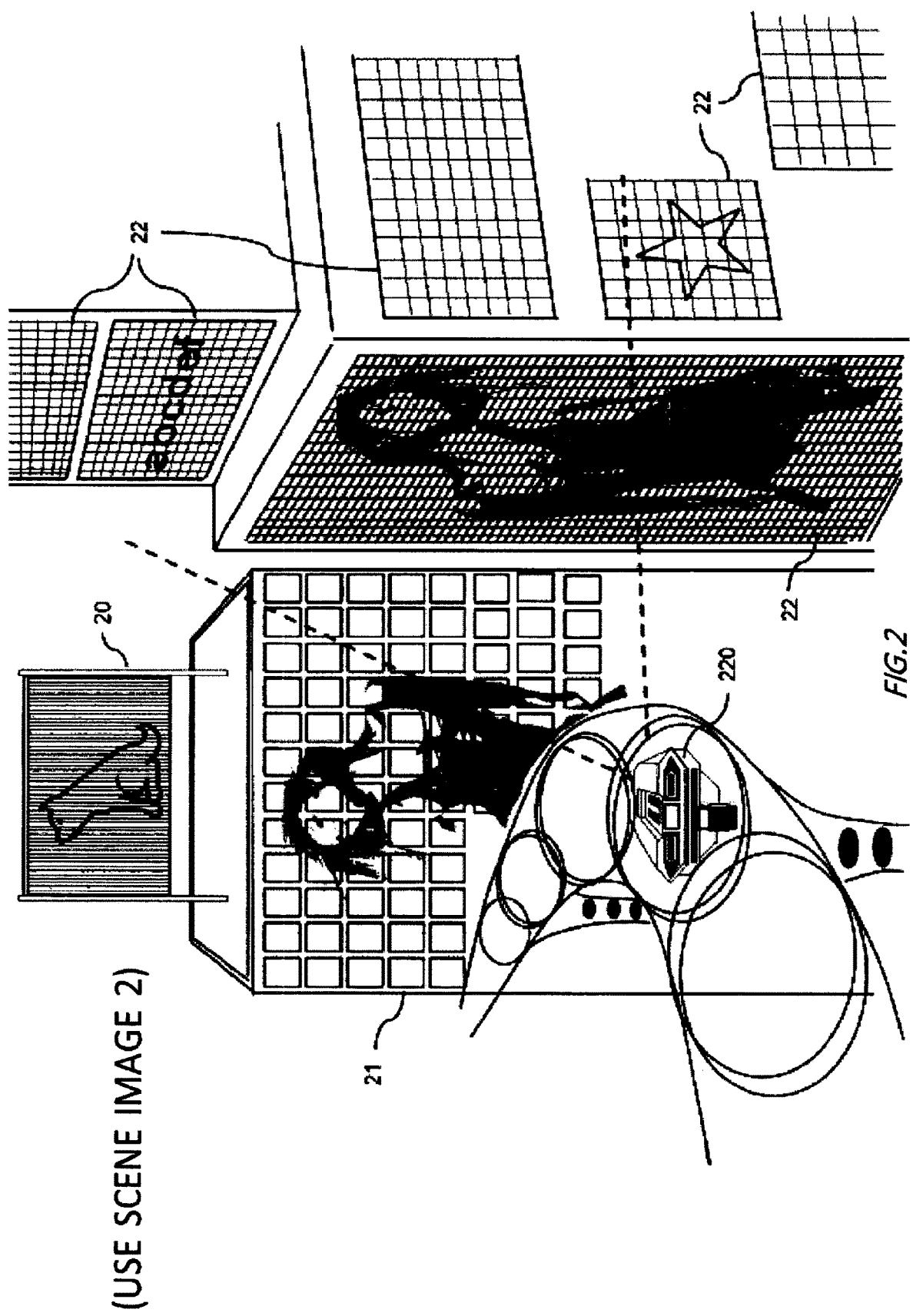
FIG. 2 is a diagram illustrating another example of the image of the use scene.

An example of another use scene will be described with reference to FIG. 2. FIG. 2 is another example of a service image using the present embodiment. This service image illustrates an outdoor environment. Building windows include a plurality of digital signage screens 20 that display moving images or still images such as advertisements and news, and furthermore, by using projection mapping 21 and mirror image digital signage 22 using the building windows, the moving images or still images such as advertisements and news are projected on a wall surface of the building. In the present embodiment, in order to greatly expand the performance of a mobile terminal 220 such as a portable terminal of a pedestrian or a portable terminal moving on an automobile, a bus, or the like in such an environment, a method and a device are provided which configure the new optical supplemental downlink 312 for increasing the throughput of the portable terminal by using digital signage or projected images in addition to wireless technology such as WiFi, 4G, and 5G. In this system, a service with a high throughput can be provided even in a place where radio waves are weak.

Figure 3:
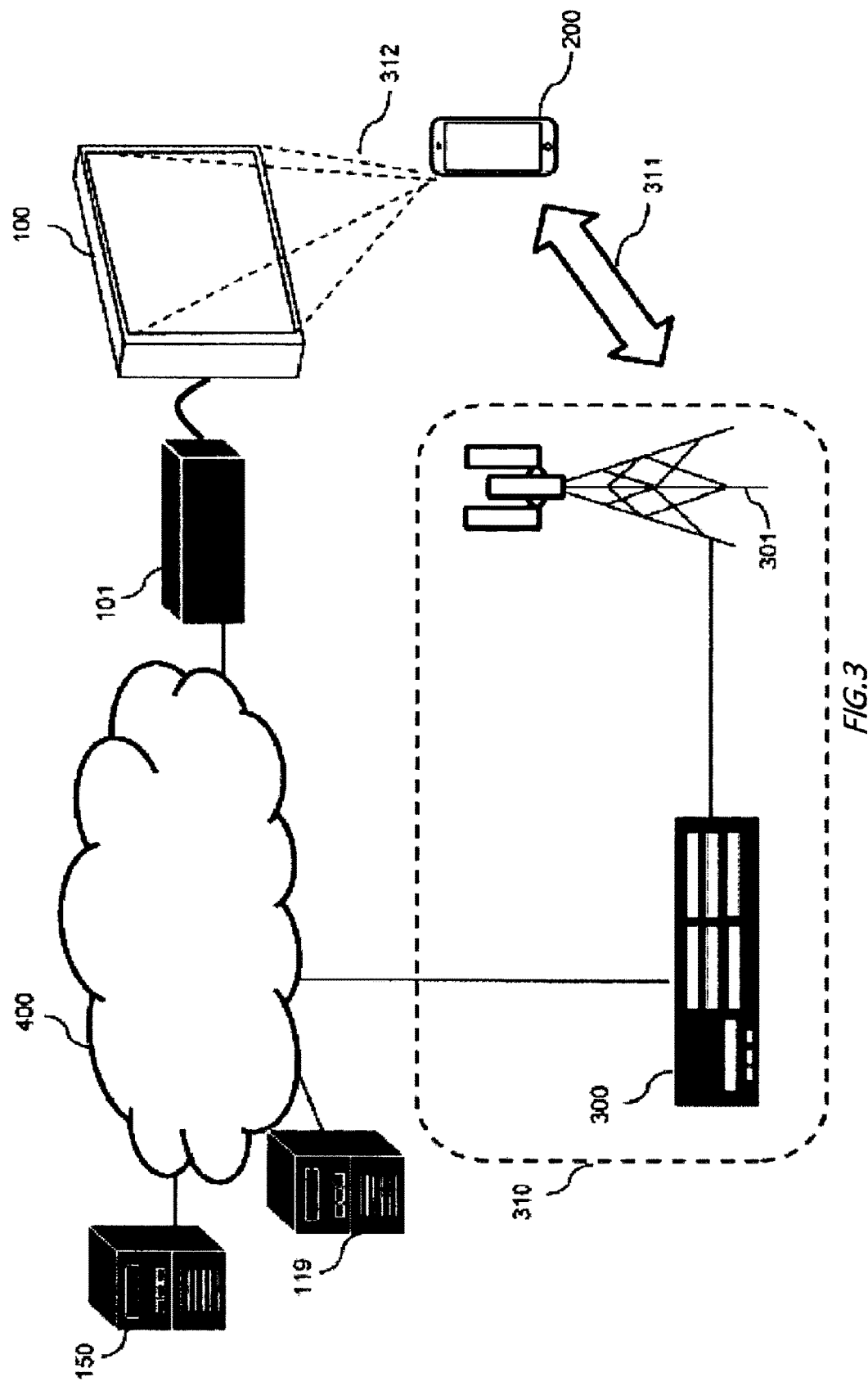
FIG. 3 is a diagram illustrating an example of a communication system configuration.

An example of a communication system configuration will be described with reference to FIG. 3. FIG. 3 illustrates an implementation example of the present embodiment. Herein, a portable phone service is considered as an existing communication service, and a communication terminal is for mobile services such as LTE and 5G by radio, but at the same time, has a display unit of digital signage or an imaging unit 201, which captures a projected image, for the optical supplemental downlink 312 communication. In a display control device 101, the display unit 100 displays an image in which the optical supplemental downlink data used in the portable terminal is superimposed on content data (video signal) from a signage content server 150. The signage content server 150 which stores the content data of the digital signage is connected to the display control device 101 via a broadband Internet 400, and a baseband unit (BBU) 300 which generates and sends optical supplemental downlink data is also connected to the display control device 101 via the broadband Internet 400, an optical fiber, or the like. An image processing server 119 may be connected to the broadband Internet or may be connected to a mobile network such as LTE or 5G. The display unit 100 may be a wall-mounted display or a projector for projection. The communication terminal 200 has communication means such as RF mobile communication 311 for communication with this display control device 101, in particular for uplink signals. It is sufficient if the communication means of uplink is any communication means, either wireless or wired. In this drawing, the uplink also uses an interface of a portable phone network 310 such as LTE or 5G using a remote radio head (RRH) 301, but may use Ethernet (registered trademark) or WiFi, for example.

Figure 4:
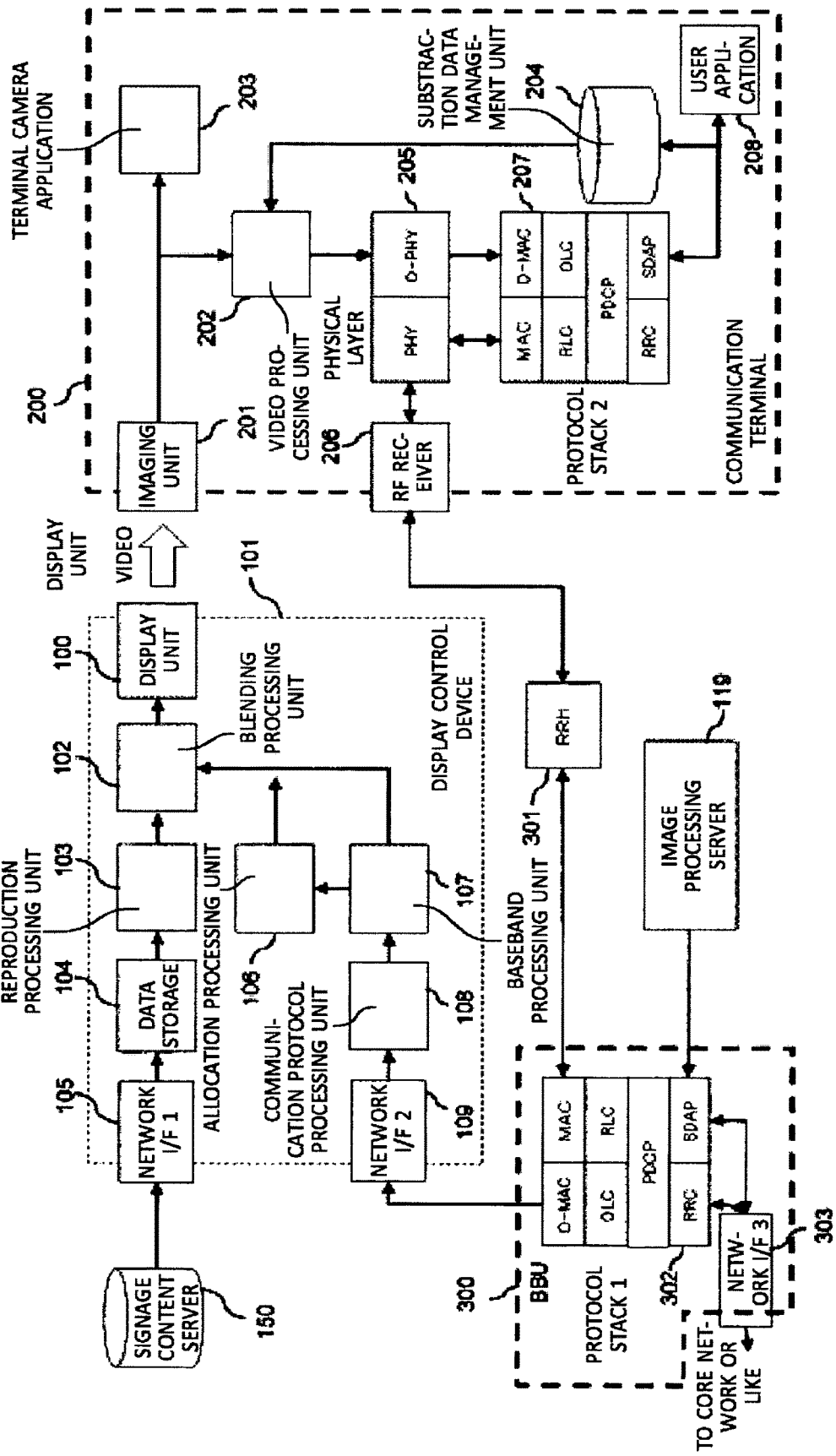
FIG. 4 is a diagram illustrating an example of a system configuration diagram.

An example of a system configuration will be described with reference to FIG. 4. FIG. 4 illustrates an example of a detailed block diagram of each device in the system configuration of FIG. 3. In this example, in addition to a normal protocol stack to a remote radio head (RRH) 301 for portable services, a communication system for portable services, a base band unit (BBU) 300 performs conversion into, as a protocol stack for optical supplemental downlink 312 to the display control device 101 used in the present embodiment, an optical link control layer (OLC) with a retransmission function (ARQ) of the logical channel of the portable service, and further a MAC layer for optical supplemental downlink 312 (O-MAC) and a PHY layer for optical supplemental downlink 312 (O-PHY). The O-PHY is not displayed due to an interface to the display control device, but serves, for example, as Ethernet in the configuration as illustrated in the previous diagram. In addition, unlike the this drawing, the OLC and the O-MAC may be placed not in the BBU 300 but in an external device connected to the BBU 300 or in the display control device 101. The display control device 101 has a network interface 105 with signage content server 150 and an interface with BBU 300, and further has an interface with the display unit 100. In addition, the communication terminal 200 has an interface including an imaging unit 201 for the optical supplemental downlink 312 in addition to the interface (RF receiver 206) of the normal portable phone network 310. In this drawing, the display unit 100 performs signage display of a display video or projection to a building wall surface. The display control device 101 provides the optical supplemental downlink 312 to the communication terminal 200. A blending processing unit 102 performs blending processing of transmission data subjected to transmission encoding processing or modulation processing by a baseband processing unit 107 and the video data of signage. A reproduction processing unit 103 performs reproduction control of the signage video. The data storage 104 stores and saves the signage data. The reproduction processing unit 103 performs a reproduction processing from the data storage 104. The network I/F 1 105 is on the display control device 101, and is an interface for a signage server 150 via the broadband Internet. An allocation processing unit 106 allocates the transmission data to the pixel on the display unit 100. A baseband processing unit 107 performs L1 processing such as encoding and modulation of the transmission data. A communication protocol processing unit 108 performs L2 processing such as channel processing and retransmission processing of the transmission data. A network I/F 2 109 is on the display control device 101, and is an interface for the BBU 300 via the broadband Internet 400, CPRI, or the like. The signage content server 150 provides signage content such as advertisement content of a still image or a moving image to the display control device 101 via the broadband network 400. The communication terminal 200 performs reception and decoding processing of the optical supplemental downlink 312 provided by the display control device 101. The imaging unit 201 is on the communication terminal 200, performs optical processing such as zoom processing, focus processing, and spectroscopy on a received video, and also performs O/E conversion using a sensor. A video processing unit 202 reduces interference by processing of subtracting signage data separately prepared in advance from the video data received by the imaging unit 201. A terminal camera application 203 is an application program which uses a video of signage data. A substraction data management unit 204 manages, stores, and saves the signage data for the subtraction processing used by the video processing unit 202. A physical layer 205 provides L1 functions for RF of LTE, 5G, and the like and for optical communication. The image processing server 119 has an image processing function of reading a two-dimensional code and a test pattern from image data captured by a communication terminal.

Figure 5:
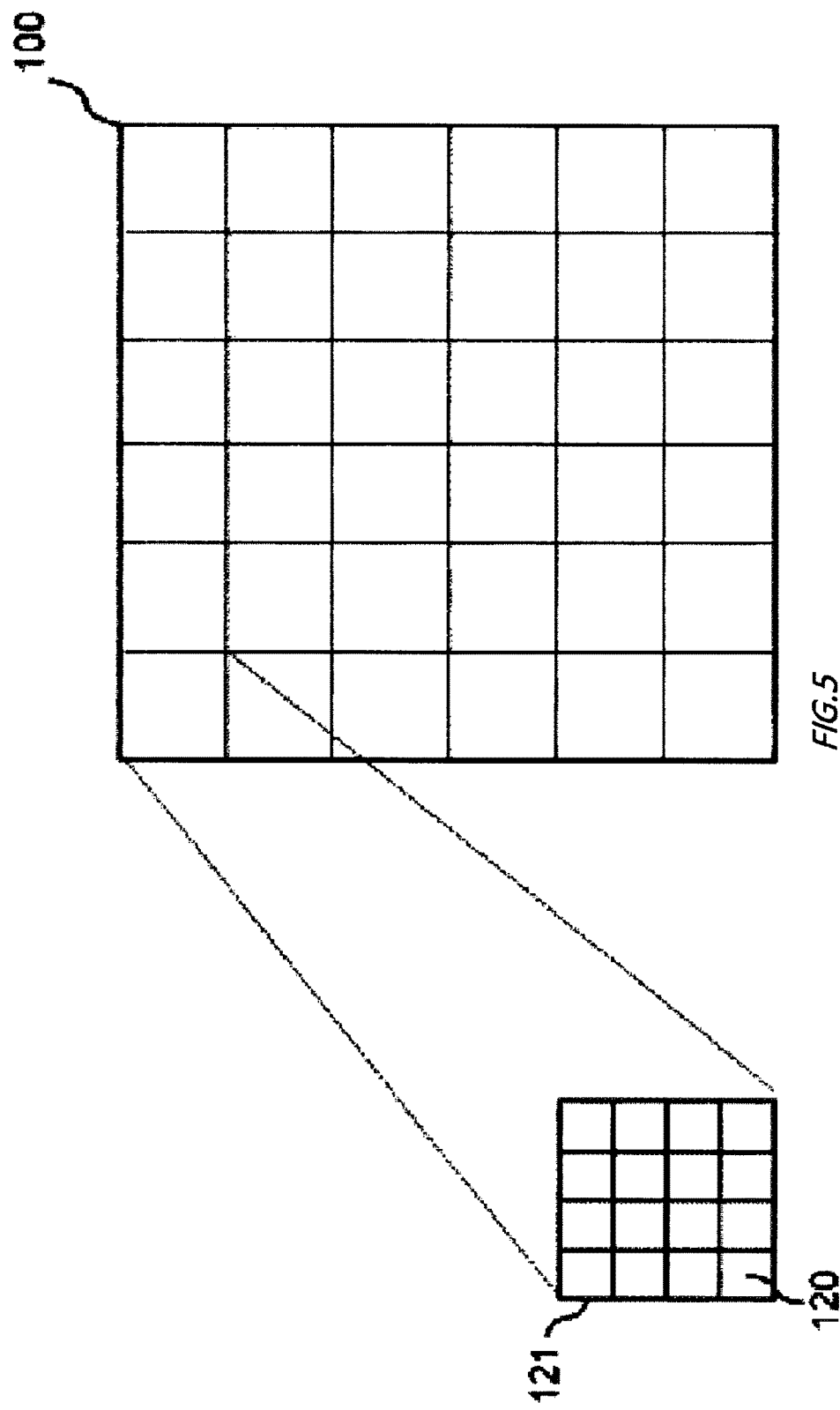
FIG. 5 is a diagram illustrating an example of a configuration of a segment.

An example of a structure of a segment will be described with reference to FIG. 5. The display unit 100 includes a plurality of segments 121, and each segment 121 includes a plurality of pixels 120. This digital image is used so that the unit segment 121 larger than a pixel is used as a constituent unit for sending a supplemental downlink, whereby communication can be realized even in a bad communication environment.

Figure 6:
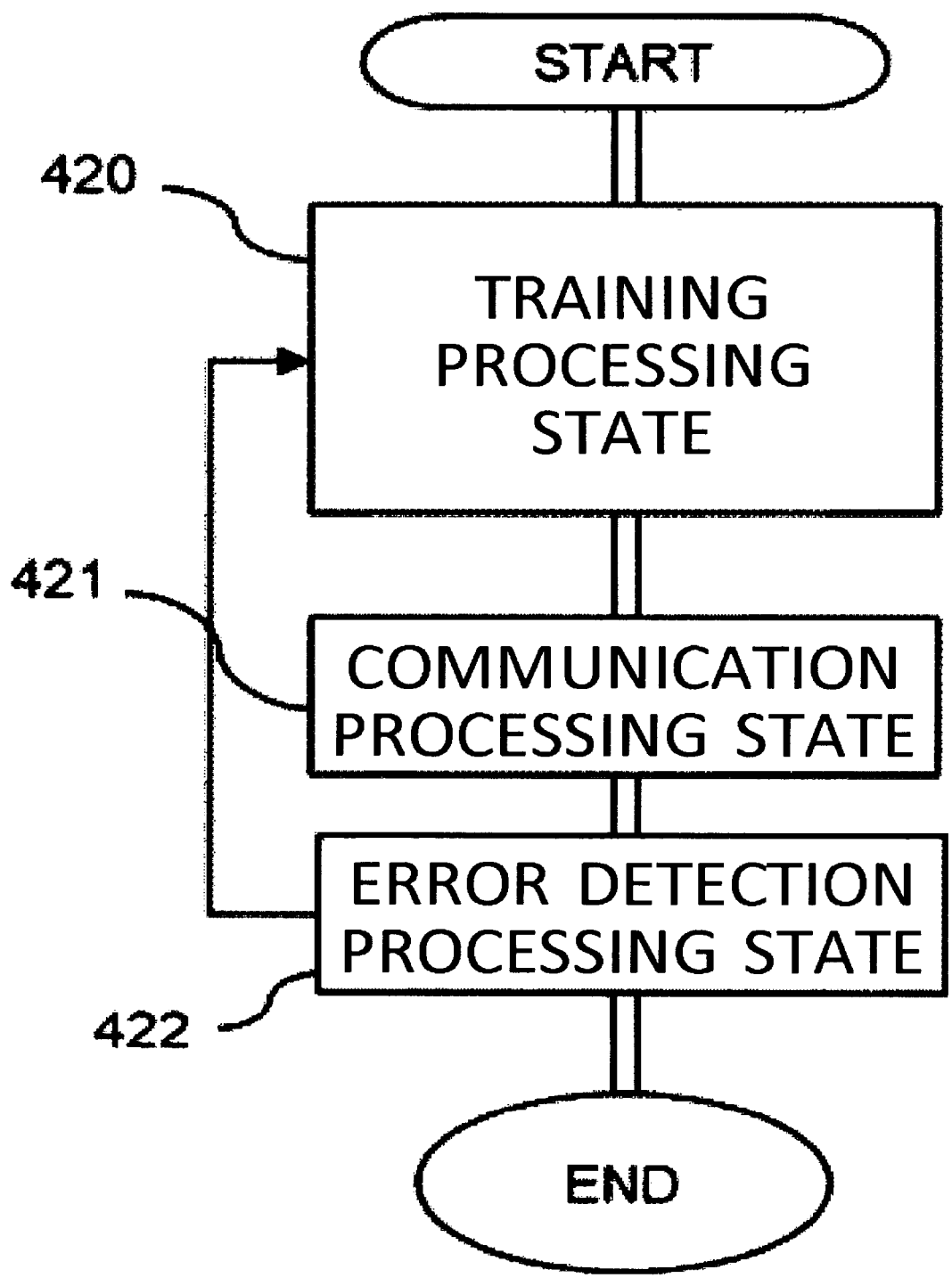
FIG. 6 is a diagram illustrating an example of a flow of a processing state.

An example of a communication cycle will be described with reference to FIG. 6. FIG. 6 illustrates a flow of the communication cycle. There are provided a training processing state 420 in which adaptation of pixels to be used is performed according to a communication status, a communication state 421 in which communication of the optical supplemental downlink 312 is performed, and an error detection processing state 422 in which an error in communication is detected, and when an error is detected, the processing returns to the training processing state 420, adaptation of pixels to be used again and communication processing are cyclically performed, and this cycle is executed until the end of communication.

Figure 7:
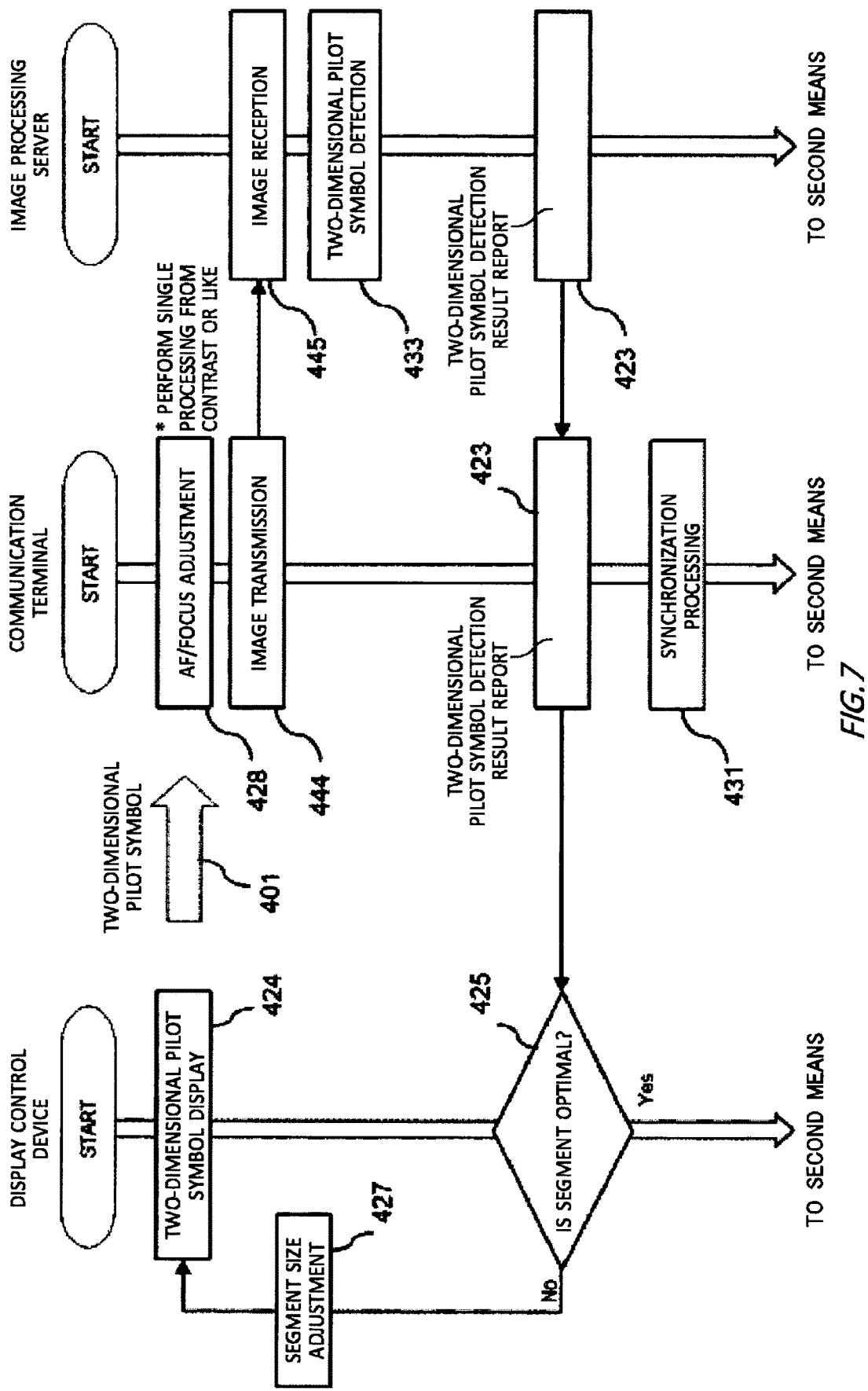
FIG. 7 is a diagram illustrating an example of a first option of a first means.

An example of a first option of a first means will be described with reference to FIG. 7. In the first option of the first means, the display control device causes the display unit to perform sending 424 of a two-dimensional pilot symbol using a two-dimensional code. After performing the AF focus adjustment 428, the communication terminal performs image transmission 444 of an imaging result to the image processing server by using an existing wireless communication means (WiFi, 3G, 4G, 5G, or the like), and the image processing server performs image reception 445 and performs two-dimensional pilot symbol detection 433 from the result. A result report 423 of the two-dimensional pilot symbol detection is performed to the communication terminal similarly by the existing wireless communication means (WiFi, 3G, 4G, 5G, or the like). The communication terminal performs time synchronization processing 431 based on the detection report. The display control device receives the two-dimensional pilot symbol detection result report 423, and when the two-dimensional pilot symbol 401 has not been received, a segment size is increased by the segment size adjustment 427, and the training processing is performed again. If the two-dimensional pilot symbol 401 has been received, the processing proceeds to a second means.

Figure 8:
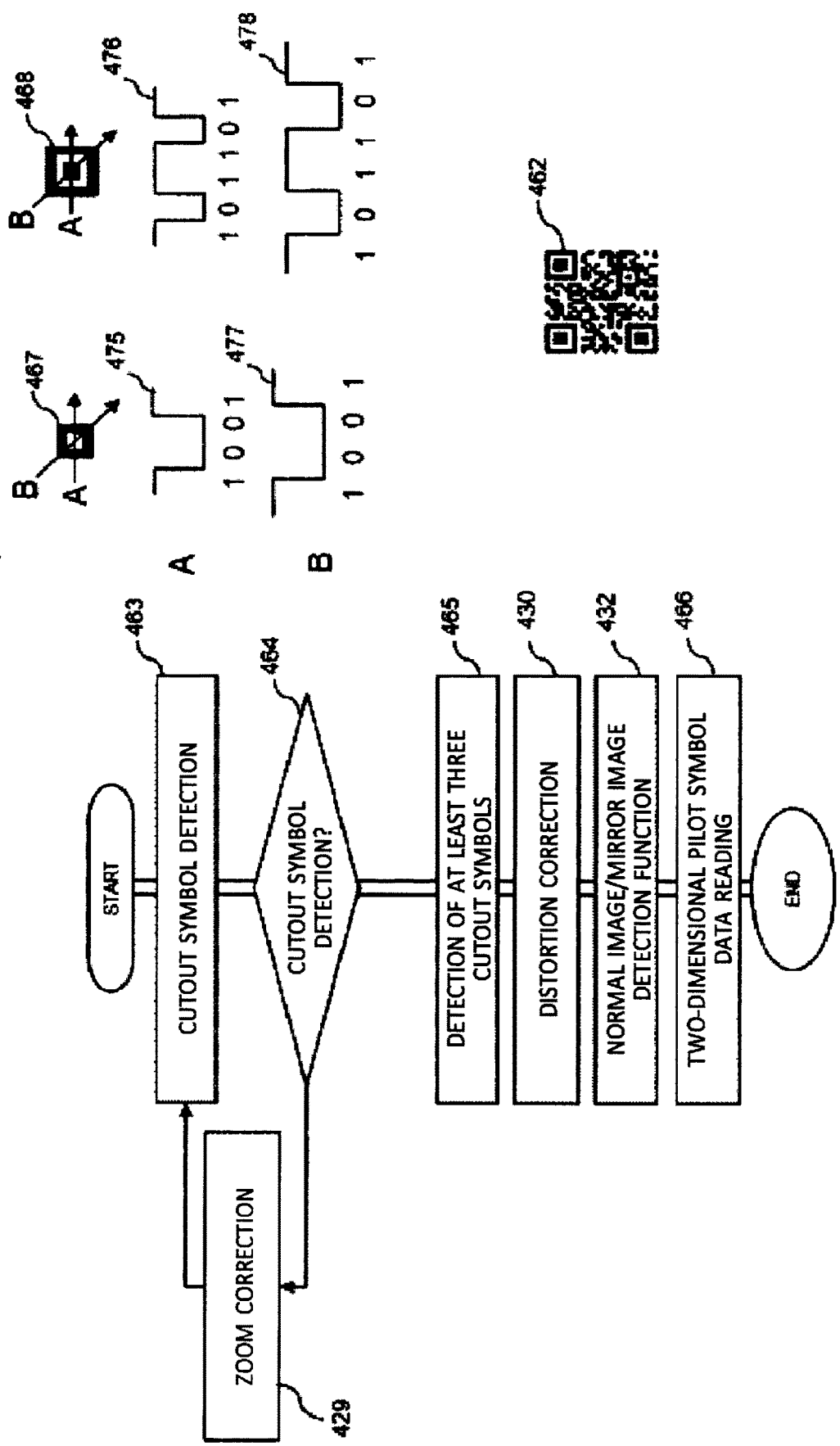
FIG. 8 is a diagram illustrating an example of a two-dimensional pilot symbol detection processing flow.

An example of detection processing of the two-dimensional pilot symbol 401 of the first option of the first means will be described with reference to FIG. 8. When the QR code (registered trademark) is used as the two-dimensional pilot symbol 401, the communication terminal 200 first performs cutout symbol detection 463. When the cutout symbol 462 cannot be detected, zooming is performed by the zoom correction 429, and then detection is performed again. The QR code includes at least three cutout symbols 462, and the cutout symbols 462 of the QR code always have the same ratio between black cells and white cells at any position of A and B, so that the rotation angle can be recognized from the position of the cutout symbol even when the captured image is rotating. In addition, it is possible to detect the positional deviation of a dot due to a distortion by the alignment pattern of the QR code, and the distortion correction 430 is performed by affine transformation or the like from the positional relationship of the cutout symbols detected at least three points. Further, in order to cope with the reflected image, whether the image is a normal image or a mirror image is detected by this normal image mirror image detection function 432 by using the cutout symbols of the three points, and two-dimensional pilot symbol data reading 466 is performed.

Figure 9:
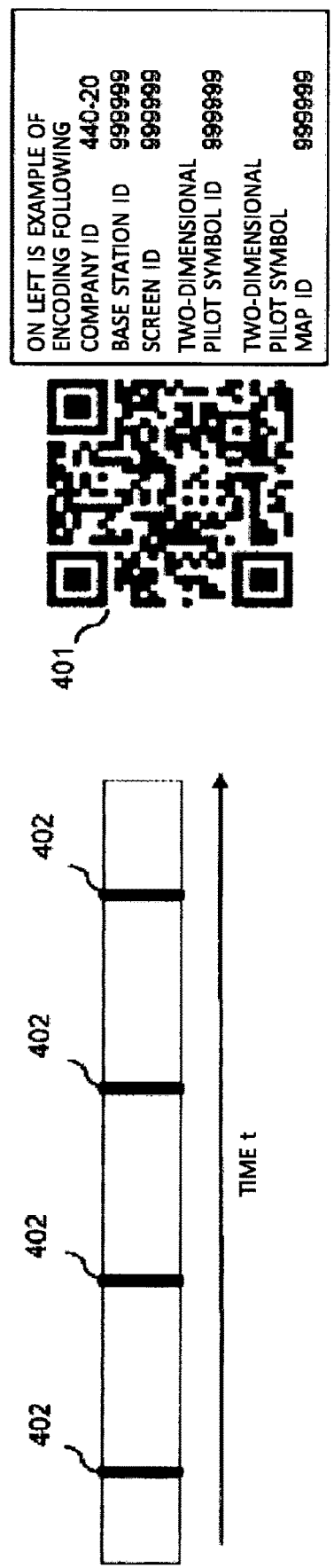
FIG. 9 is a diagram illustrating an example of a two-dimensional pilot symbol.

An example of a case where a QR code is used as the two-dimensional pilot symbol 401 of the first option of the first means will be described with reference to FIG. 9. The two-dimensional pilot symbol 401 includes a company ID for identifying a company, a base station ID for identifying a base station, a screen ID for identifying a display unit, and a two-dimensional pilot symbol map ID for identifying each two-dimensional pilot symbol 401 when a plurality of two-dimensional pilot symbols 401 is used. In addition, time synchronization is enabled by displaying a two-dimensional pilot symbol frame 402 at a specific time.

Figure 10:
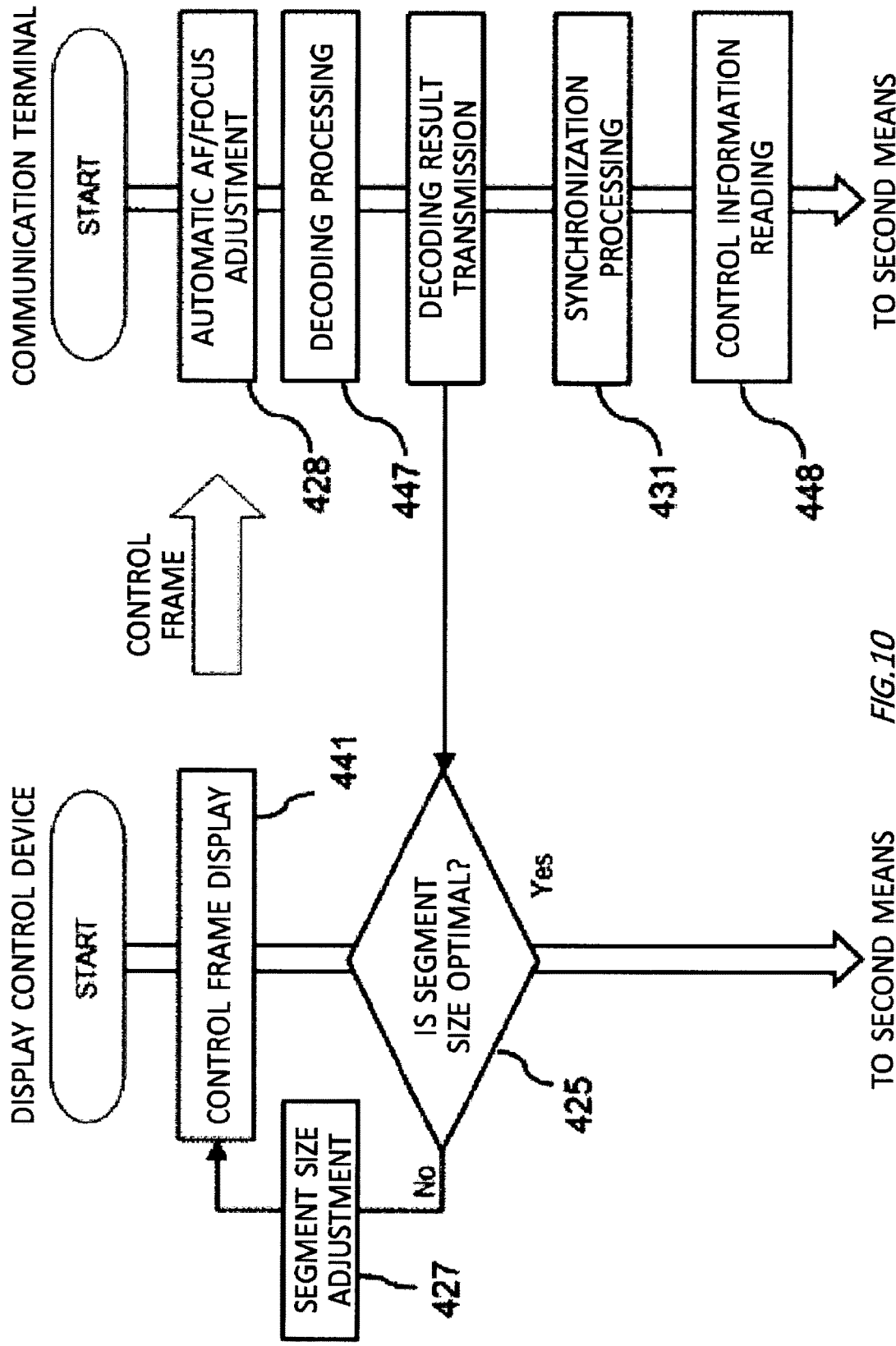
FIG. 10 is a diagram illustrating an example of a second option of the first means.

An example of a processing flow of a second option of the first means will be described with reference to FIG. 10. The display control device 101 performs control frame display 441 to display a control frame superimposed on image data on the display unit 100. The communication terminal 200 performs autofocus (AF)/focus adjustment 428 for maximizing the contrast of the captured image of the display unit 100 and signal processing 447 such as zoom adjustment/distortion correction, and then sends a fact, which indicates whether the control frame has been received, to the display control device 101 by signal result transmission by using the existing wireless communication means (WiFi, 3G, 4G, 5G, or the like). When a predetermined number of segments has not been decoded normally, the display control device 101 changes the segment size by the segment size adjustment 427 and performs the training process again. The communication terminal further performs frame synchronization processing by using a preamble 481 of the control frame. The communication terminal 200 continues imaging and decides whether to enter the training process again or to proceed to the second means.

Figure 11:
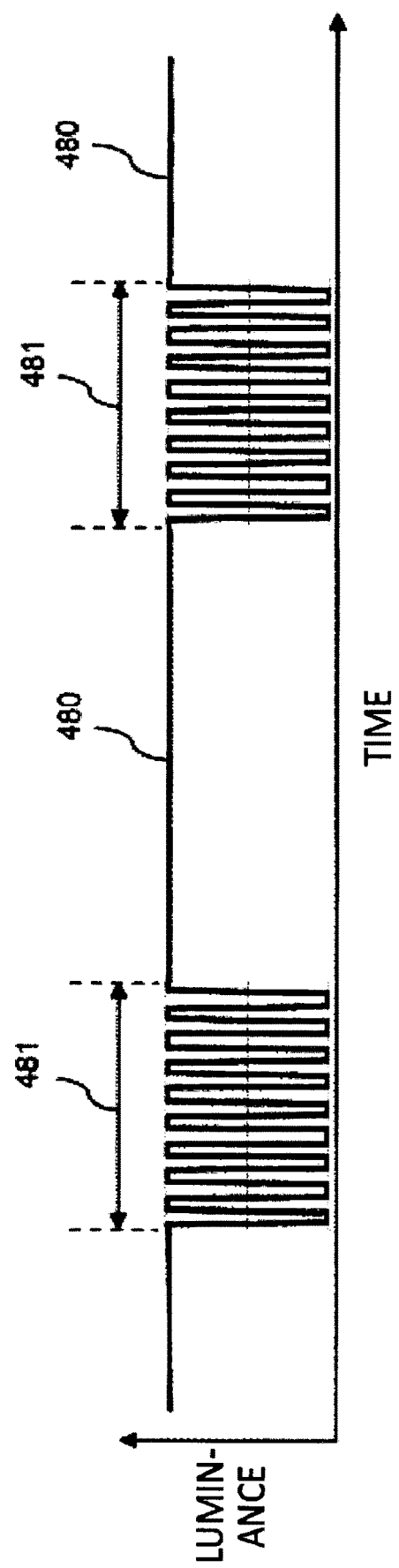
FIG. 11 is a diagram illustrating an example of a control frame of the second option of the first means.

An example of a frame on a time axis used in the second option of the first means, a third option of the second means, and a third means will be described with reference to FIG. 11. This frame is provided with the preamble 481 for synchronization, and then enters a control or data frame. The second option of the first means and the third option of the second means use a control frame 412 and a data frame 413 with a preamble, and the first option of the first means, the second option of the second means, and the third means use a control frame 414 and a data frame 415 without a preamble. This frame is used for each segment.

Figure 12:
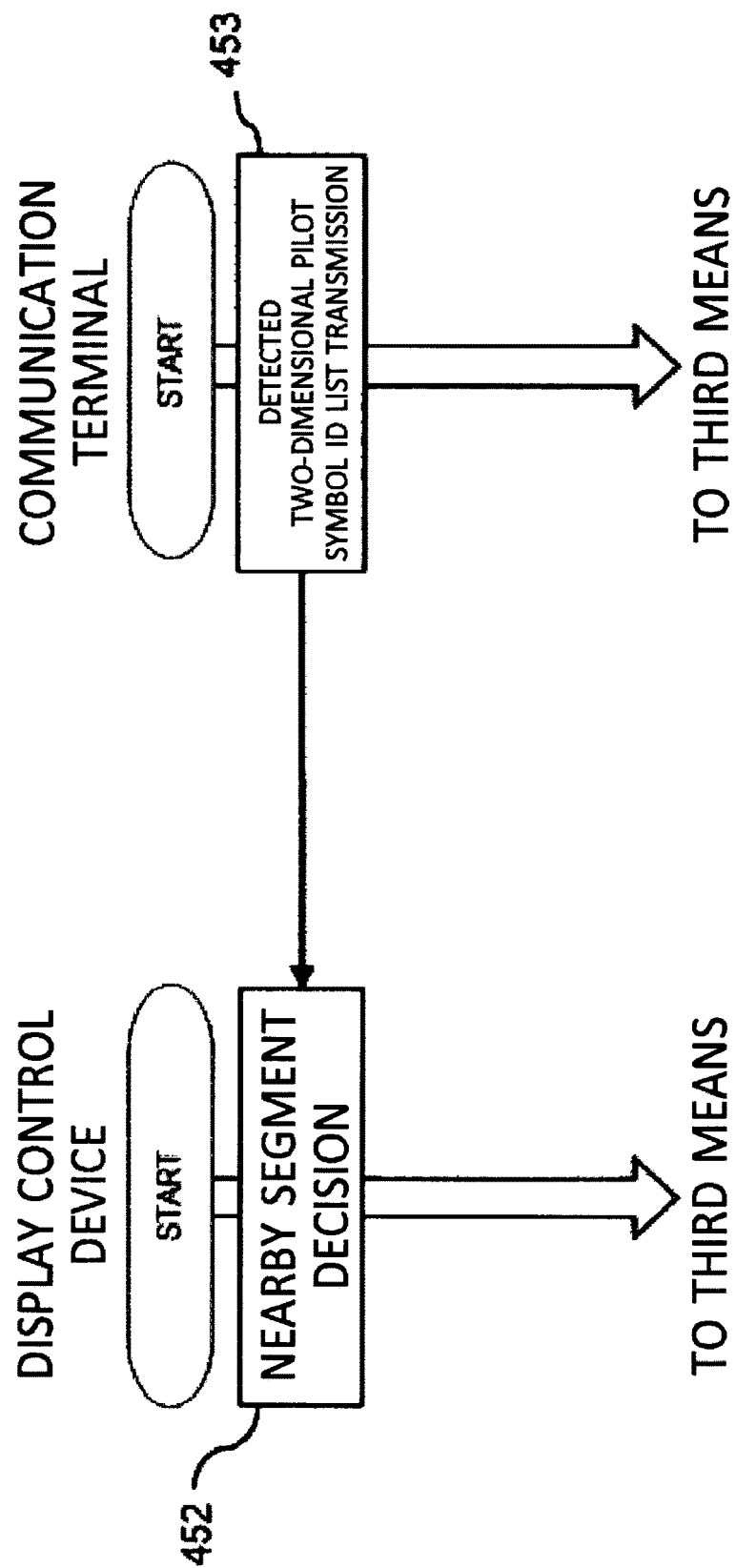
FIG. 12 is a diagram illustrating an example of a first option of a second means.

An example of processing of the first option of the second means will be described with reference to FIG. 12. In this option, the communication terminal sends, to the display control device, the list of the two-dimensional pilot symbols 401 detected in the first option of the first means by the detection pilot list transmission 453 by using the existing wireless communication means (WiFi, 3G, 4G, 5G, or the like). After sending the detection pilot ID list, the communication terminal continues to send the imaging result to the image processing server until entering the third means, and if receiving, from the image processing server, a report that the captured image is a test pattern, recognizes to perform the second option of the second means. When there is no report that the captured image is a test pattern, the communication terminal continues the imaging of the display unit, automatically enters the third means, and quickly enters the reception of the supplemental downlink. In this case, in the third means, supplemental data communication is performed by using the vicinity of the detected two-dimensional pilot symbol 401.

Figure 13:
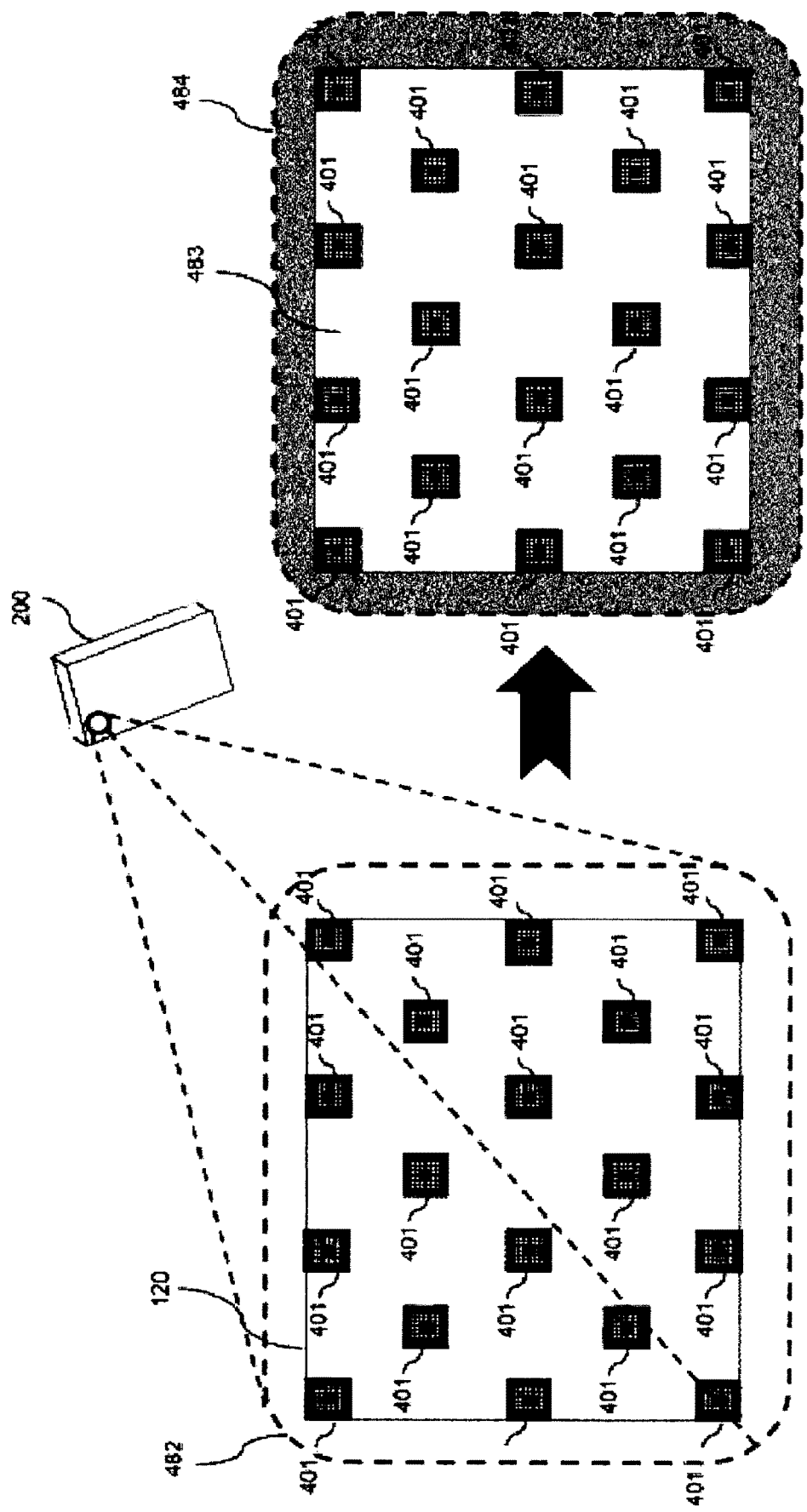
FIG. 13 is a diagram illustrating an example of decision of a segment.

An example of deciding a segment for supplemental downlink communication in the first option of the second means will be described with reference to FIG. 13. The communication terminal 200 images the display unit 120. In this example, an imaging range 482 of the communication terminal is larger than the display unit 120. Eighteen two-dimensional pilot symbols 401 are displayed on the display unit 120. When the communication terminal sends a fact, which indicates that all two-dimensional pilot symbols 401 have been received, to the display control device by using the existing wireless communication means (WiFi, 3G, 4G, 5G, or the like), the display control device sets all the segments of the display unit 483 determined from the position of the two-dimensional pilot symbols 401 within a imaging range 484 to be available and enters a third procedure.

Figure 14:
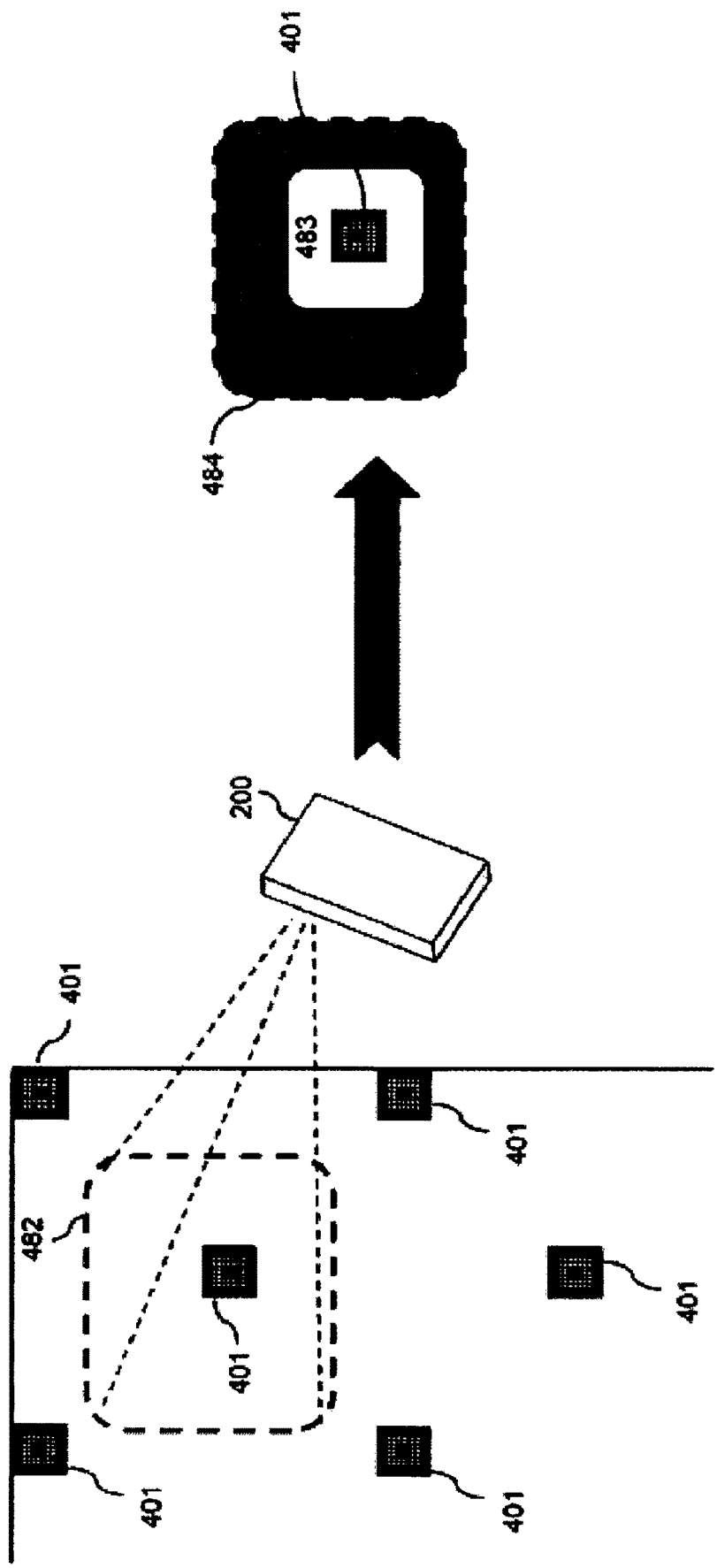
FIG. 14 is a diagram illustrating another example of the decision of a segment.

Another example of deciding a segment for supplemental downlink communication in the first option of the second means will be described with reference to FIG. 14. The communication terminal 200 images the display unit. In this example, the imaging range 482 of the communication terminal is smaller than the display unit 120. One two-dimensional pilot symbol 401 is displayed in the imaging range 482, and this one two-dimensional pilot symbol ID is sent as the detected two-dimensional pilot symbol 401 to the display control device by using the existing wireless communication means (WiFi, 3G, 4G, 5G, or the like). The display control device sets a vicinity 483 of the two-dimensional pilot symbol 401 in the imaging range 484 to be available and enters the third procedure. The shape of the vicinity may be a rectangle, a circle, or another shape, and the size of the vicinity is determined in advance in the imaging range 484. In addition, a result of previous successful communication may be used, and AI can be used.

Figure 15:
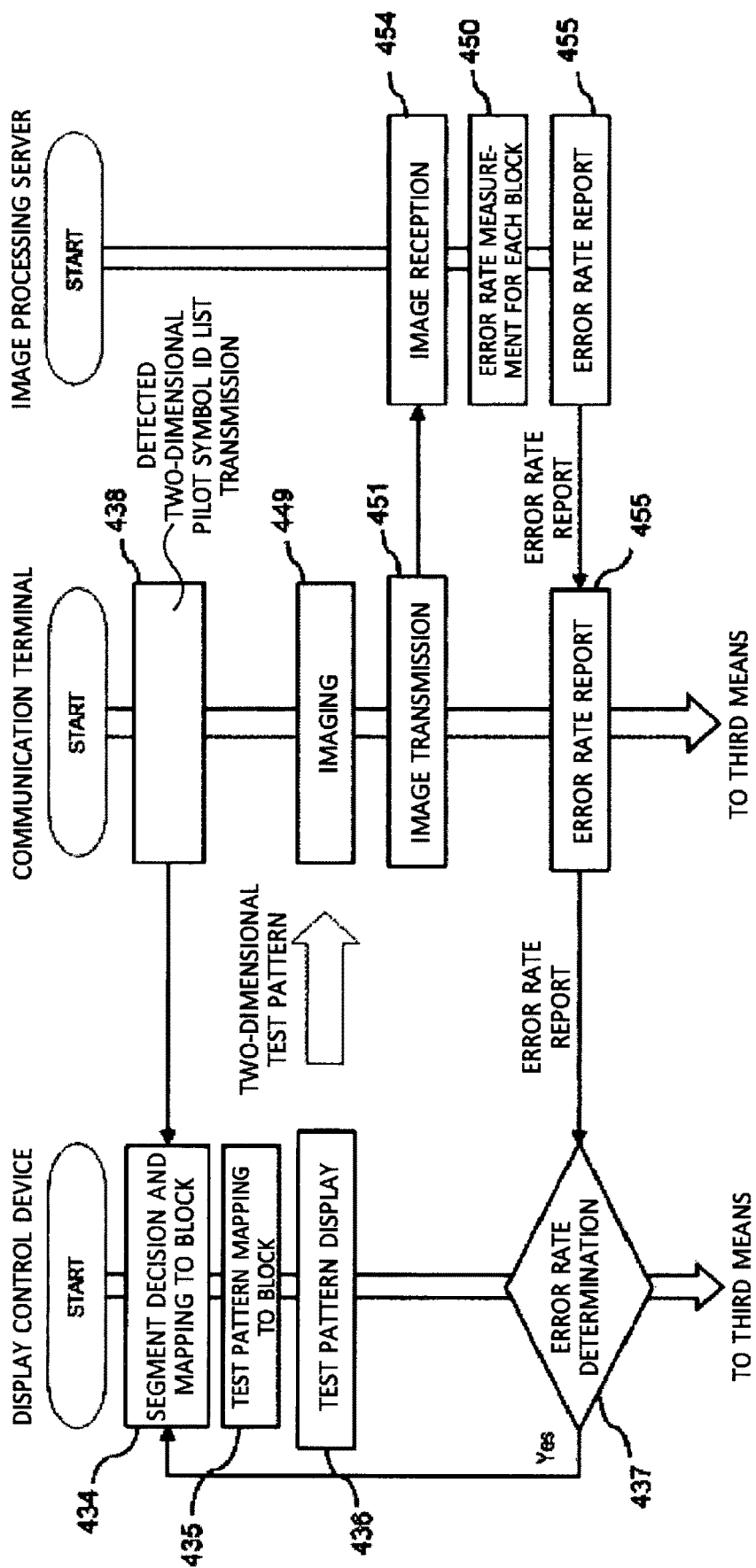
FIG. 15 is a diagram illustrating an example of a second option of the second means.

An example of processing of the second option of the second means will be described with reference to FIG. 15. The display control device receives the result of the first means, that is, the list of detected two-dimensional pilot symbol IDs by detected two-dimensional pilot symbol ID list transmission 438 of the communication terminal by using the existing wireless communication means (WiFi, 3G, 4G, 5G, or the like). The segment size is decided based on the result, and the block size for error rate measurement is decided by mapping 434 to a segment size decision block. The block includes an error detection or error correction code in addition to the two-dimensional test pattern. Herein, the display control device displays the two-dimensional test pattern on the display unit by test pattern display 436. The communication terminal images the test pattern by imaging 449, and sends the result to the image processing server by image transmission 451 by using the existing wireless communication means (WiFi, 3G, 4G, 5G, or the like). The image processing server receives the image captured by the communication terminal by image reception 454, measures an error rate for each block by error rate measurement 450 for each block using the recognized block, and sends the error rate as the result to the communication terminal by error rate report 455 by using the existing wireless communication means (WiFi, 3G, 4G, 5G, or the like). By this reception, the communication terminal sends the error rate to the display control device by the error rate report 455 by using the existing wireless communication means (WiFi, 3G, 4G, 5G, or the like). The communication terminal continues to capture an image and sends the result to the image processing control server 119, and if receiving a report of a high error rate, the communication terminal determines that training is necessary again, and otherwise, the communication terminal proceeds to the third means. The display control device determines whether the error rate is appropriate by error rate determination 437, and when the error rate is equal to or less than a predetermined threshold value, the display control device proceeds to the third means. If the error rate is equal to or greater than the threshold value, the processing returns to the mapping 434 to the segment size decision block to change the segment size and the block size, and the training is performed again. As this threshold value, a value obtained when communication has succeeded previously may be used, or learning may be performed by AI. In addition, the function of the image processing server 119 may be performed by the communication terminal 200.

Figure 16:
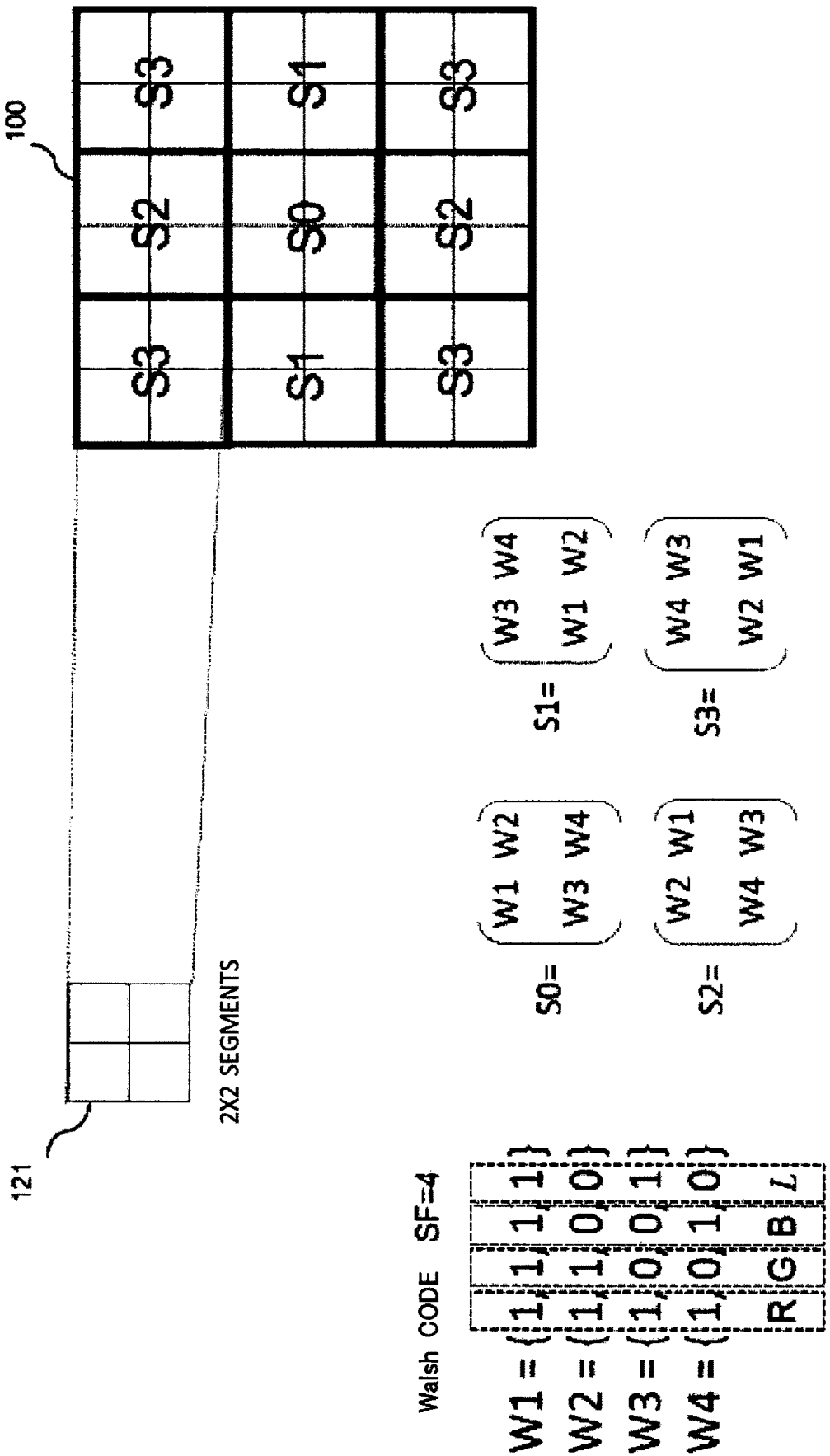
FIG. 16 is a diagram illustrating an example of segment creation in the second option of the second means.

An example of a structure of the two-dimensional test pattern used in the second option of the second means will be described with reference to FIG. 16. This test information includes a digital two-dimensional image on a space including dots in which hue and luminance of pixels are changed for each segment, and is realized by displaying the digital two-dimensional image at specific time intervals. The time interval is set to a predetermined time, and is detected by using a reference time by the first means. A resolution and a segment that can be used between the display unit and the communication terminal are decided by the test pattern. This test pattern is superimposed on the video signal and sent as test information at a segment not used or a time not used by the first means. In this second option, the segments are identified by giving different hues and/or luminances to adjacent segments on the basis of the resolution decided by the first means. In this case, in order to identify adjacent segments, it is necessary to give at least four different pieces of information to the adjacent segments by a four-color theorem. The four different pieces of information need to be orthogonal or at least quasi-orthogonal. Herein, it is possible to use a multi-value signal based on hues of RGB and luminances, and it is possible to perform a test in one frame without using a plurality of frames. For example, a Walsh code can be used as the orthogonal code. FIG. 16 illustrates an example using a Walsh code of SF=4. Since SF=4, the units of segment identification include 2×2 segments 121. A structure 100 including nine segments including the 2×2 segments 121 will be described as an example. The Walsh code of SF=4 is $W(0,4)=1,1,1,1$ $W(1,4)=1,0,1,0,$ $W(2,4)=1,1,0,-1$ $W(3,4)=1,0,0,1$ and S0, S1, S2, and S3 are as follows. Herein, each element in S0, S1, S2, and S3 corresponds to each segment of the 2×2 segments 121. For example, the upper left of the 2×2 segments 121 is set to W1 in S0. Herein, in the structure 100 including nine segments, W1 does not exist in the adjacent periphery of W1, W2 does not exist in the adjacent periphery of W2, W3 does not exist in the adjacent periphery of W3, and W4 does not exist in the adjacent periphery of W4. Since W1, W2, W3, and W4 are orthogonal to each other, each segment can be identified.

$$S0 = \begin{pmatrix} W1 & W2 \\ W3 & W4 \end{pmatrix} S1 = \begin{pmatrix} W3 & W4 \\ W1 & W2 \end{pmatrix}$$

$$S2 = \begin{pmatrix} W2 & W1 \\ W4 & W3 \end{pmatrix} S3 = \begin{pmatrix} W4 & W3 \\ W2 & W1 \end{pmatrix}$$

Herein, when the first three bits are assigned to R, G, and B, and the last is a luminance L, a minimum of four pieces of information can be sent in one frame, and adjacent segments can be identified in a minimum time. In addition, when the first three bits are used for white balance for recognizing a correct color tone in order to reliably detect a hue, a correct color tone can be detected in the communication state, and a multi-value signal using the hue can also be used. Although a 4-bit Walsh code is used in the above example, a quasi-orthogonal code may be used in another orthogonal code or environment. In addition, herein, according to the four-color theorem, the 4-bit Walsh code is used to identify four adjacent segments, but it is also possible to use a long code using a multi-value signal so that more segments can be identified. In addition, a plurality of video frames can also be used. However, since the number of frames for sending the test information increases and processing time is required, it is necessary to pay attention to an increase in the number of frames in mobile communication. In this option, the RGB value is also set to multiple values, and thus, in a block including a plurality of segments, it is possible to measure a bit error rate by sending, to the display unit, a signal in which the entire segment is a pseudo-random code including a multi-value signal. Based on the resolution information as the result of the first means, a block size thereof is decided by the image processing server. For example, if many segments of the display unit can be used, a short pseudo-random code may be used, and therefore a block including a small number of segments may be used. The size of this block may be a fixed number of blocks on the basis of the bit error rate to be detected. Herein, for example, when it is assumed that 128 gradations can be used for one segment, 8-bit allocation is possible, and sixteen segments are set as one block, so that 128-bit data can be sent. For this reason, frames of an image signal obtained by superimposing this information will be used for this second means. Since the time afterimage of human eyes is 50 ms to 100 ms, for example, in the case of video information of 60 fps, one image frame is 16.7 ms, so that a certain image frame can be used as the second means without any problem. In addition, a plurality of image frames for one second can be used as the second means by using the afterimage time of the eye. In this method, since one frame of an image is simply used as compared with a method using a stream on a time axis, the time of one cycle of processing is shortened, furthermore, a performance can be improved by using a forward error correction code (FEC) instead of an error detection code, and a compatibility with existing displays and projectors is also excellent. The error rate also can be measured by the error detection code or the forward error correction code.

Figure 17:
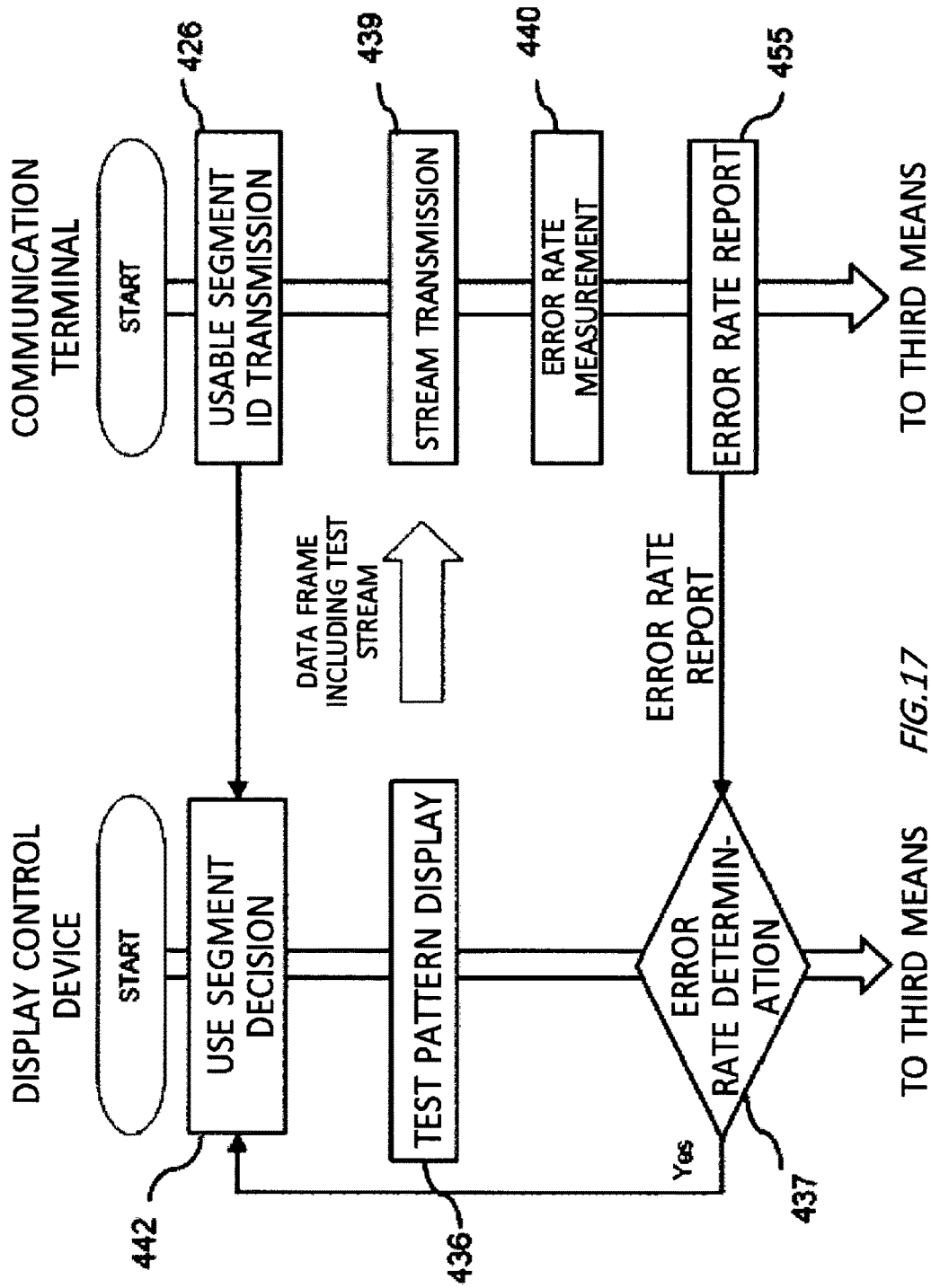
FIG. 17 is a diagram illustrating an example of a third option of the second means.

An example of processing of the third option of the second means will be described with reference to FIG. 17. In this example, the second option is used as the first means. The display control device receives the result of the first means, that is, the available segment information obtained as a result of the second option of the first means by available segment ID transmission 426 by using the existing wireless communication means (WiFi, 3G, 4G, 5G, or the like). A segment to be used is decided based on the result by use segment decision 442, and a test stream to which an error detection or error correction code is added is sent as a data frame to the display unit by test stream display 436. The communication terminal receives the data frame by stream reception 439, and sends the result of error rate measurement 440 to the display control device by error rate report 455 by using the existing wireless communication means (WiFi, 3G, 4G, 5G, or the like). The communication terminal continues to capture an image, and if the test stream is received again as a result, the communication terminal continues the training processing, and otherwise, proceeds to the third means. The display control device determines whether the error rate is appropriate by error rate determination 437, and when the error rate is equal to or less than a predetermined threshold value, the display control device proceeds to the third means. If the error rate is equal to or greater than the threshold value, the processing returns to the use segment decision 442, and the training is performed again. As this threshold value, a value obtained when communication has succeeded previously may be used, or learning may be performed by AI. In addition, the function of the image processing server may be performed by the communication terminal.

Figure 18:
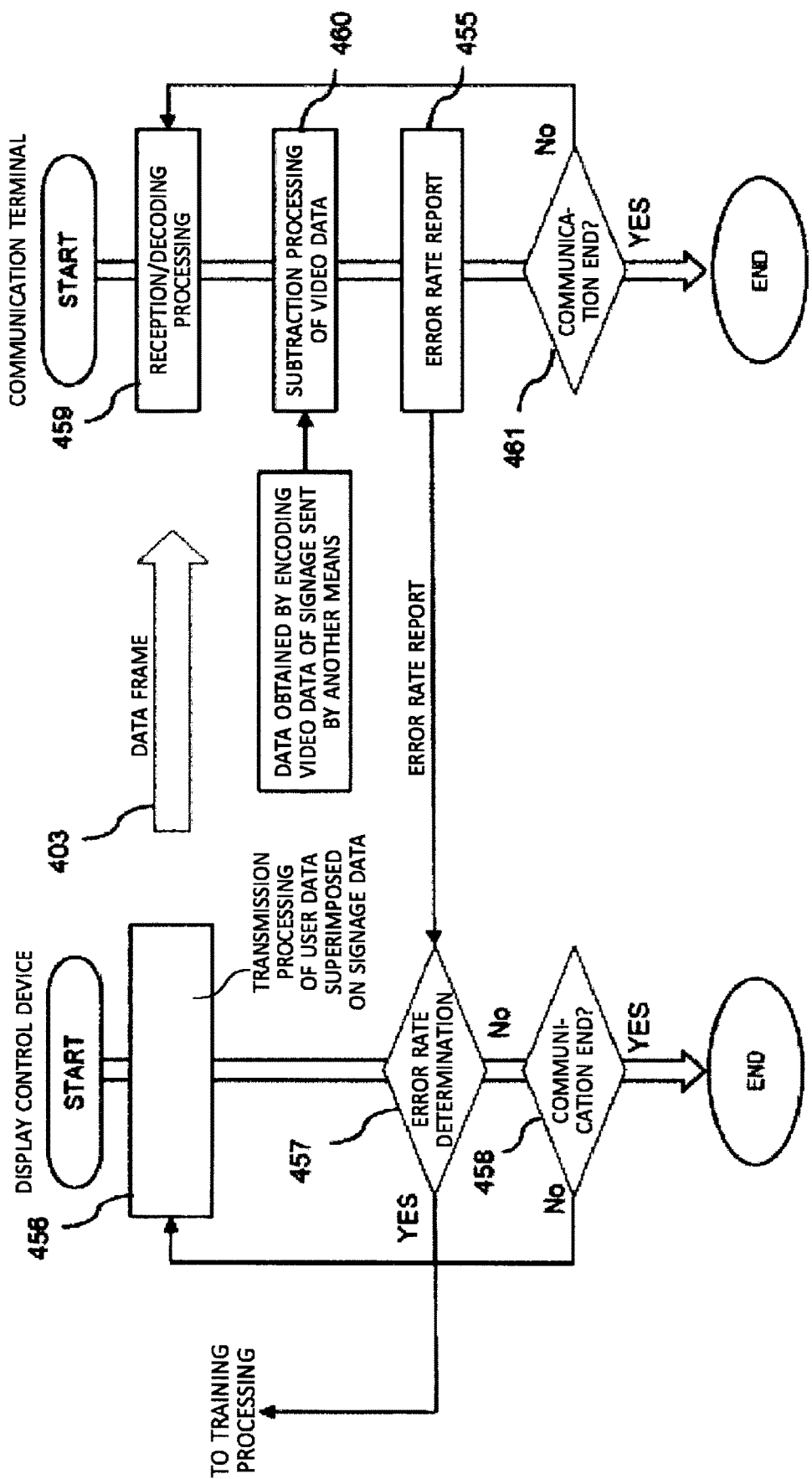
FIG. 18 is a diagram illustrating an example of a processing flow of a third means.

An example of processing of the third means will be described with reference to FIG. 18. The display control device superimposes the data of the supplemental downlink on the image data as a data frame 403 by transmission processing 456 of the user data superimposed on the signage data, and sends the result to the display unit. The communication terminal captures an image displayed on the display unit, and extracts the supplemental downlink data from the data frame by reception signal processing 459. Here, if data obtained by encoding signage image data sent in advance by another means is present in the communication terminal, the image data can be used to extract highly accurate supplemental downlink data by image data (noise) subtraction 460. Since the data frame includes the error detection or error correction code, the communication terminal sends the error rate of the data frame to the display control device by the error rate report 455 by using the existing wireless communication means (WiFi, 3G, 4G, 5G, or the like). The display control device determines whether the error rate is appropriate by the error rate determination 457, continues the communication if the error rate is equal to or less than a predetermined threshold value, and performs the training processing again if the error rate is equal to or greater than the threshold value. As this threshold value, a value obtained when communication has succeeded previously may be used, or learning may be performed by AI. In addition, the function of the communication terminal may be performed by the image processing server.

Figure 19:
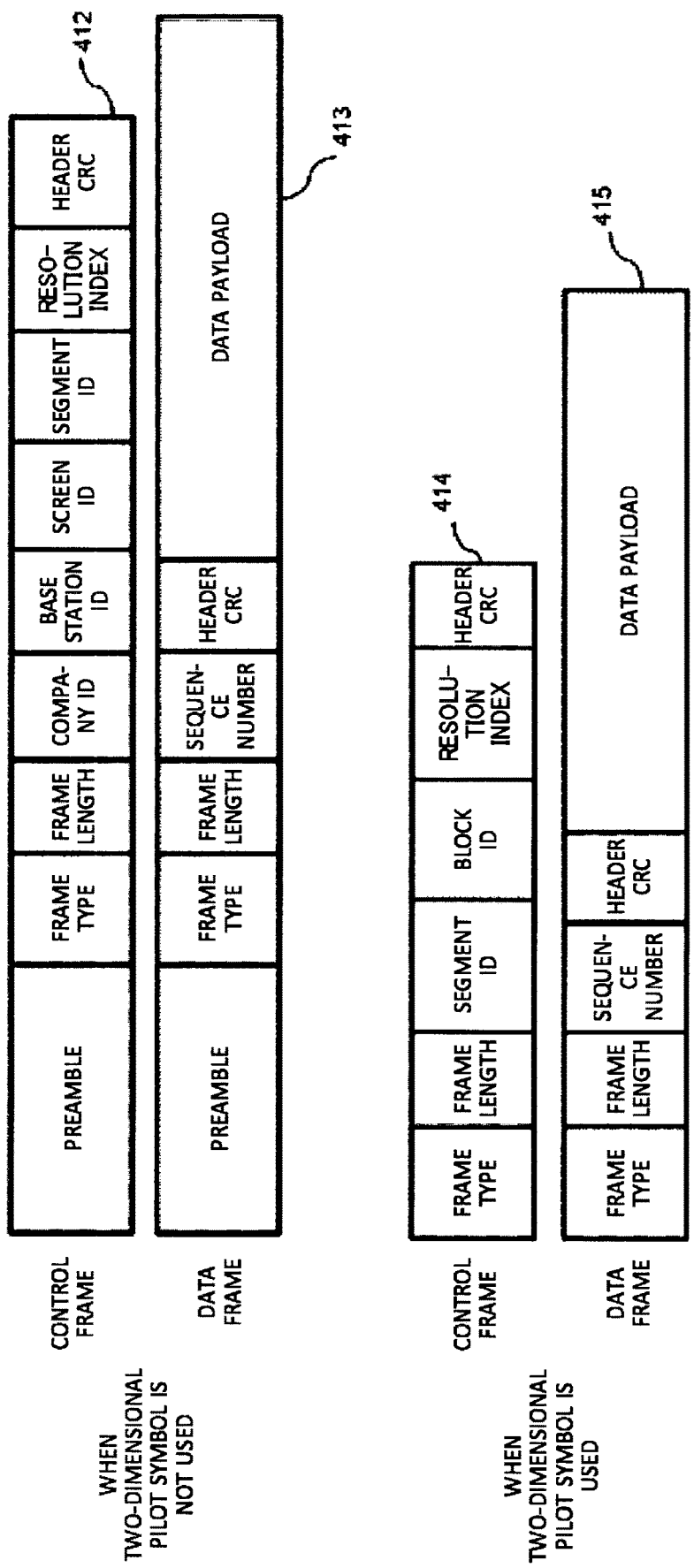
FIG. 19 is a diagram illustrating an example of a segment frame.

An example of the segment frame will be described with reference to FIG. 19. The segment frame includes a control frame and a data frame, which flow in a data region in a time axis direction. When the two-dimensional pilot symbol 401 is not used, a frame configuration with a preamble is provided for the purpose of synchronization and reference signal. The case of single light source illumination such as LED is this system. On the other hand, when there is the two-dimensional pilot symbol 401, a reference time for synchronization and a reference signal are present, and thus no preamble is provided, and some information, for example, the base station ID, the company ID, the screen ID, and the like, may not be in the frame since the information is encoded in the two-dimensional pilot symbol 401. The case of screens such as signage and projection mapping is this system.

Figure 20:
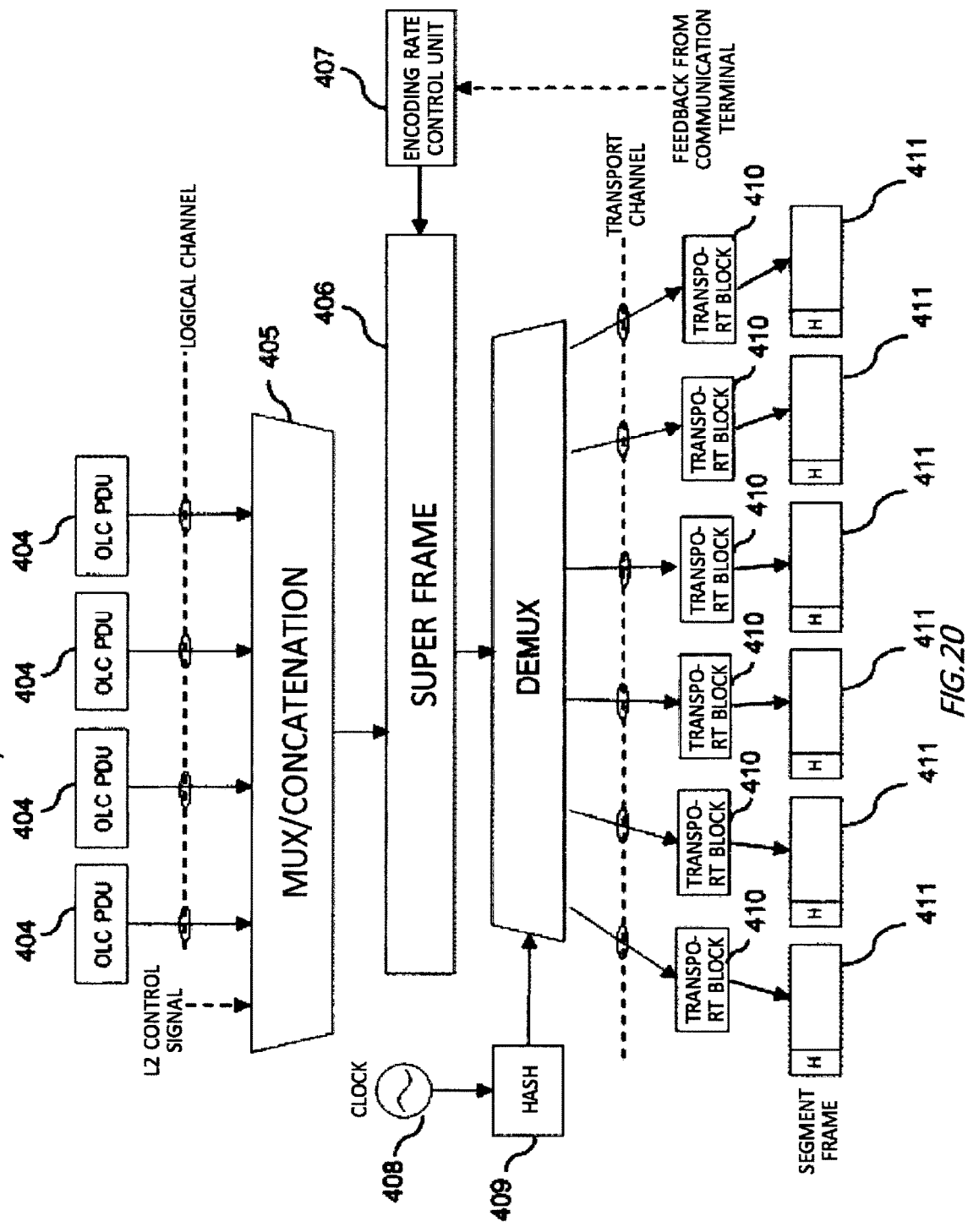
FIG. 20 is a diagram illustrating an example of a frame generation flow.

An example of the data flow will be described with reference to FIG. 20. FIG. 20 illustrates an example of the data flow of optical supplemental downlink 312 and an example of realization of forward error correction described in claim 16. A packetized protocol data unit (PDU) 404 of an optical link control layer (OLC) having a retransmission function described in the detailed block diagram is multiplexed and combined for redundancy and scrambling by a control signal of Layer 2, and an encoding rate control unit 407 decides necessary redundancy on the basis of the error rate reported from the communication terminal 200, generates a forward error correction code, and generates a super frame 406 available for error correction. This super frame 406 includes a transport block 410 for all available pixels, generates the transport block 410 for each pixel of the display unit on the basis of a hash table generated by a hash function by an encoding method, and sends the transport block 410 to the display unit 100. As a result, even if the communication terminal 200 cannot decode data from some segments, the super frame can be restored by forward error correction.

Figure 21:
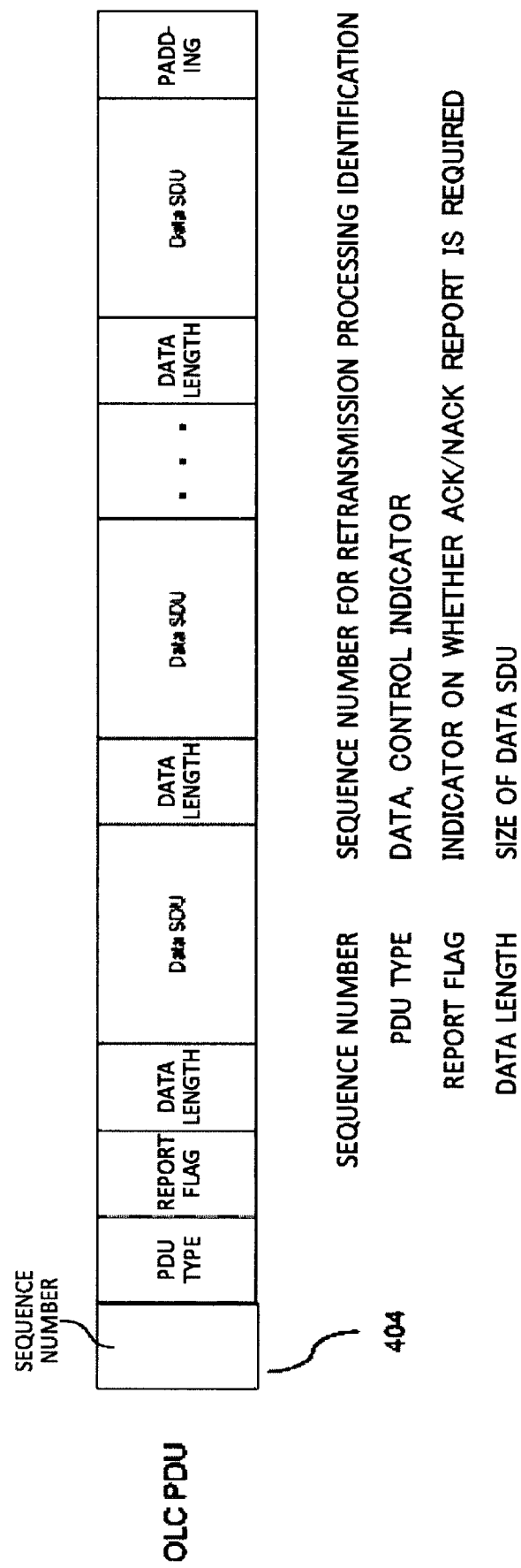
FIG. 21 is a diagram illustrating an example of an optical link control frame.

An example of an optical link control frame will be described with reference to FIG. 21. FIG. 21 illustrates an example of the protocol data unit (PDU) 404 of the optical link control (OLC). The OLC PDU 404 is generated for each radio bearer coming from the PDCP of the portable service, has a sequence number, and can perform retransmission control for each bearer. In addition, depending on the type of the bearer, it is possible to set whether the retransmission control is necessary or unnecessary, and this control is performed by a report flag. Thereafter, the OLC PDU is subjected to MUX as the super frame 406, and is mapped to the transport channel as illustrated in FIG. 20.

Figure 22:
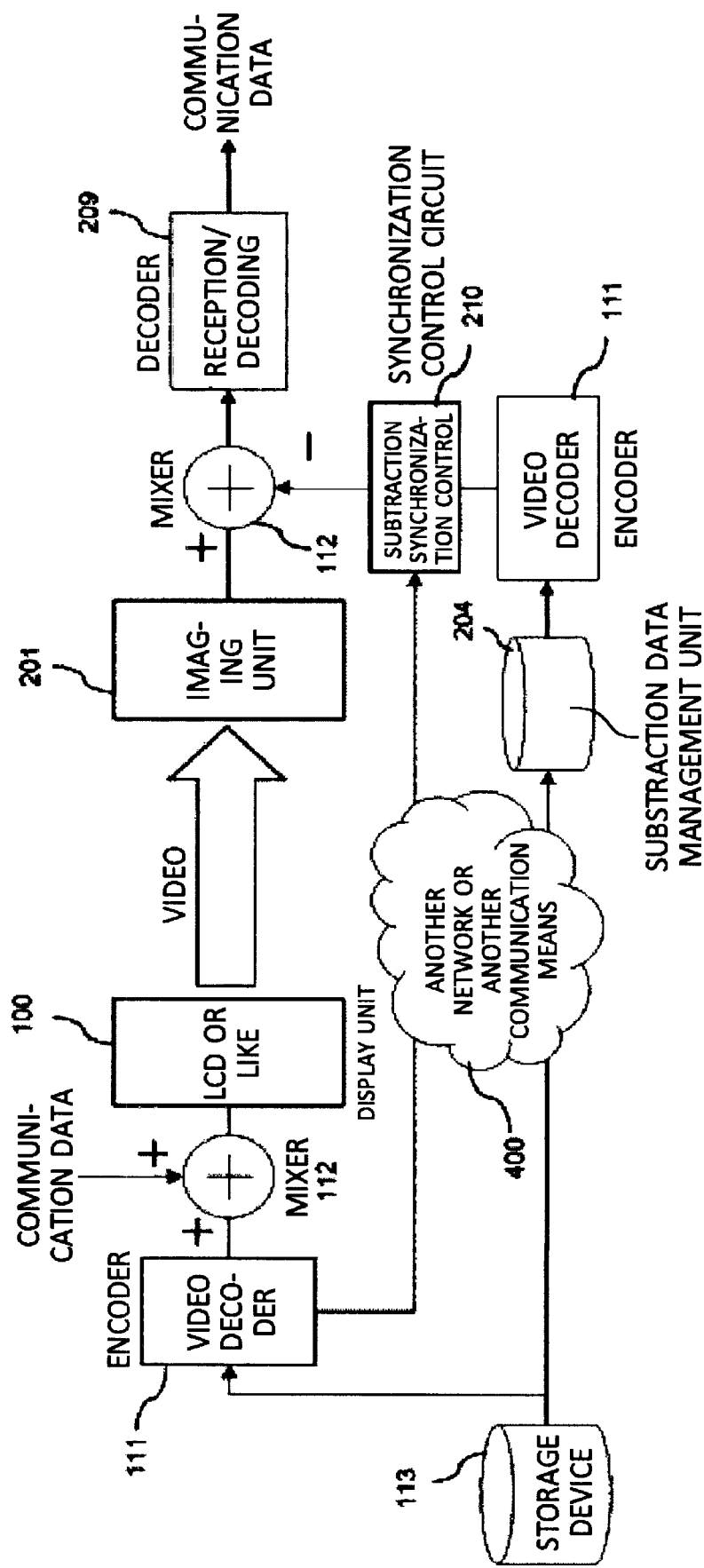
FIG. 22 is a diagram illustrating an example of subtraction processing of video data.

An example of a configuration in a case where a communication terminal has a copy of source data of a display video of signage will be described with reference to FIG. 22 (subtraction processing of video data). FIG. 22 illustrates an example of a configuration in a case where the communication terminal 200 has a copy of the source data of the display video of signage. In the communication terminal 200, the source data of the video before decoding used in the display control device 101 is stored in the substraction data management unit 204 inside the communication terminal by another means such as a USB disk, WiFi, LTE, or 5G. In the display control device 101, the source data of the video before decoding is decoded by an encoder 111, and the optical supplemental downlink data is superimposed and then displayed on the display unit 100. Although the communication terminal 200 decodes the display data, the source data of the video before decoding stored in the substraction data management unit 204 of the communication terminal 200 is decoded according to a used codec type (for example, H.265, VP9, VVC, or the like) on the basis of metadata in a file container, and subtraction is performed from the data of a downlink with a supplement surface receiving the decoded data by the mixer 112, so that the remaining data becomes the control and data frame of the optical supplemental downlink 312. Accordingly, it is possible to dramatically improve SNR.

Superimposing Method of Data

Figure 23:
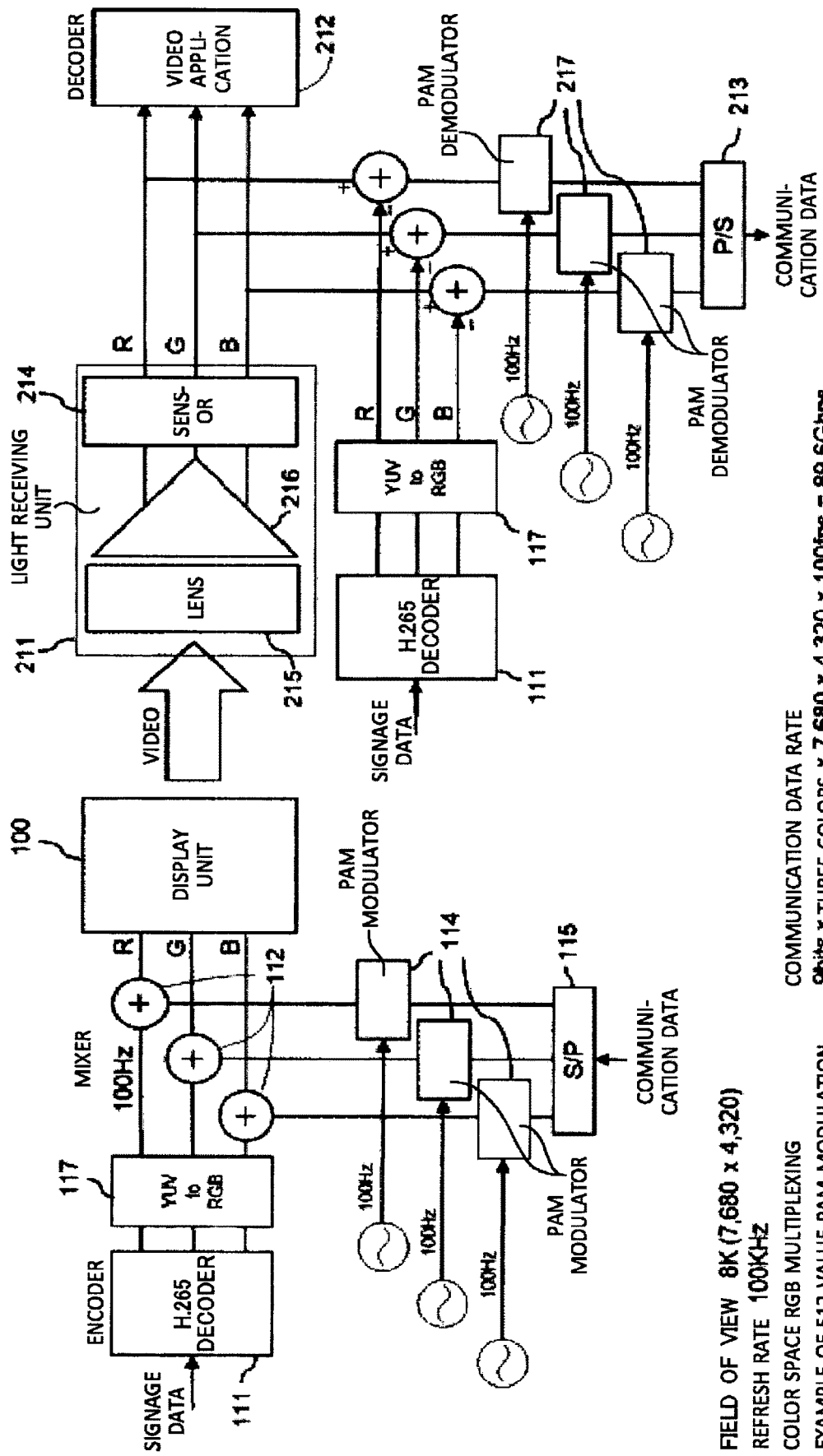
FIG. 23 is a diagram illustrating an example of a video/communication superimposing method.

An example of a video/communication superimposing method will be described with reference to FIG. 23 (video/communication superimposing method example). FIG. 23 illustrates an example of a block diagram of superimposing optical supplemental downlink data 312 on the video information. Herein, as an example, a case will be described in which the optical downlink data 312 subjected to multi-level PAM modulation of M=512 is superimposed on an LED screen having a refresh rate of 100 Hz and a resolution of 8K. Herein, the video information data used in digital signage or projection mapping is, for example, converted from a YUV color model, which is obtained by decoding source data of a video encoded in H.265 and has a luminance signal (Y), a difference signal (U) of a blue component, and a difference signal (V) of a red signal, into a three-primary color RGB color model, and separated into R/G/B for each color signal. The refresh rate of this video signal is set to 100 Hz. The optical supplemental downlink data 312 separates a serial signal into three signals for RGB multiplexing by using S/P conversion 115, and performs pulse amplitude modulation of 512 values by the PAM modulator 114. The mixer 112 superimposes the modulated signal on the video signal separated into RGB. The video signal is sent to the display unit 100. The communication terminal 200 creates an RGB signal from data captured by the lens 215 and the sensor 214 configuring an image receiving unit 211, and subtracts signage data of the RGB signal as noise data from the received RGB signal to improve a signal-to-noise ratio. The signal after the subtraction processing is demodulated into an optical supplemental downlink signal by a PAM demodulator. When the signal-to-noise ratio is still insufficient, forward error correction encoding is performed on the communication data as in claim 16, and a processing gain due to redundancy by the encoding can be gained. Herein, the RGB color model is used, but another color model may be used. In addition, as the modulation method, another method such as PPM may be used, and the rate thereof is also decided by a necessary signal-to-noise ratio. VP8 or VVC other than H.265 may be used for the video compression method.

EXPLANATION OF REFERENCES

10: single light source illumination (LED illumination); 20: digital signage screen; 21: projection mapping; 22: mirror image digital signage using building window; 100: display unit; 101: display control device; 102: blending processing unit; 103: reproduction processing unit; 104: data storage; 105: network I/F 1; 106: allocation processing unit; 107: baseband processing unit; 108: communication protocol processing unit; 109: network I/F 2; 111: encoder; 112: mixer; 113: storage device; 114: PAM modulator; 115: serial/parallel conversion; 116: oscillator; 117: YUV/RGB converter; 118: subtractor; 119: image processing server; 120: pixel; 121: segment; 150: signage content server; 200: communication terminal; 201: imaging unit; 202: video processing unit; 203: terminal camera application; 204: substraction data management unit; 205: physical layer; 206: RF receiver; 207: protocol stack 2; 208: user application; 209: decoder; 210: subtraction synchronization control unit; 211: light receiving unit; 212: video application; 213: parallel/serial conversion; 214: optical sensor; 215: lens; 216: polarizer; 217: PAM demodulator; 220: mobile terminal; 300: BBU; 301: RRH; 302: protocol stack 1; 303: network I/F 3; 310: portable phone network; 311: RF mobile communication; 312: optical supplemental downlink; 400: broadband Internet; 401: two-dimensional pilot symbol; 402: two-dimensional pilot symbol display image frame; 403: data frame; 404: OLC PDU; 405: MUX/concatenation; 406: super frame; 407: encoding rate control unit; 408: clock; 409: hash generation unit; 410: transport block; 411: SF-PDU; 412: segment frame (control frame when two-dimensional pilot symbol is not used); 413: segment frame (data frame when two-dimensional pilot symbol is not used); 414: segment frame (control frame when two-dimensional pilot symbol is used); 415: segment frame (data frame when two-dimensional pilot symbol is not used); 420: training processing state; 421: communication processing state; 422: error detection processing state; 423: two-dimensional pilot symbol detection result report; 424: two-dimensional pilot symbol display; 425: optimal segment size determination; 426: segment ID/option selection information transmission; 427: segment size adjustment; 428: AF/focus adjustment; 429: focus correction and zoom correction; 430: distortion correction; 431: synchronization processing; 432: normal image/mirror image detection function; 433: two-dimensional pilot symbol detection; 434: segment decision and mapping to block; 435: test pattern mapping to block; 436: test pattern display; 437: threshold value determination of error rate; 438: detected two-dimensional pilot symbol ID list transmission; 439: stream/option selection information transmission; 440: error rate measurement; 441: control frame display; 442: use segment decision; 444: image transmission; 445: Image reception; 447: decoding processing; 448: control information reading; 449: imaging; 450: error rate measurement for each block; 451: image transmission; 452: nearby segment decision; 453: detected two-dimensional pilot symbol ID list transmission; 454: image reception; 455: error rate report; 456: transmission processing of superimposed user data; 457: error rate determination; 458: communication end determination (display control device); 459: reception/decoding processing; 460: subtraction processing of video data; 461: communication end determination (communication terminal); 462: cutout symbol; 463: cutout symbol detection; 464: cutout symbol detection determination; 465: detection of at least three cutout symbols; 466: two-dimensional pilot symbol data reading; 467: example 1 of cutout symbol; 468: example 2 of cutout symbol; 475: signal pattern; 476: signal pattern 2; 477: signal pattern 3; 478: signal pattern 4; 480: control signal and data frame; 481: preamble; 482: imaging area; 483: communication region; and 484: non-use target area.

What is claimed is:

1. A communication system comprising: as a display unit configured to display a video, a display including a plurality of pixels using visible light configuring a digital image and/or invisible light in a far infrared region and/or a projection unit including a plurality of pixels projecting a digital image; a display control device configured to control the display unit configured to handle a single or a plurality of pixels of the plurality of pixels as one segment; a communication terminal which includes an imaging unit configured to capture the video displayed by the display unit and a communication unit with the display control device; and an image processing server which has an image processing function of receiving captured image data from the communication terminal and performing image processing, wherein the display control device has: a training processing state in which decision of resolution of the display unit and selection of the segment usable for communication between the display unit and the communication terminal is executed according to a communication status; a communication processing state in which a same hue and luminance are set to each pixel and each segment according to the resolution on a basis of a training result of the training processing state to perform communication; and an error detection processing state in which a communication error of the communication processing state is detected, and has a communication cycle which includes the training processing state, the communication processing state, and the error detection processing state and, when the communication error exceeds a threshold value, proceeds to the training processing state again and cyclically performs selection of the segment to be used for communication; the display control device has: a first unit for displaying, on the display unit, identification information for the communication terminal to recognize the display unit in addition to video information; a second unit for displaying, on the display unit, control information for selecting the segment to be used for communication from the display unit to the communication terminal in the display unit in addition to the video information; and a third unit for displaying, on the display unit, data information to be used for communication from the display unit to the communication terminal in addition to the video information; the first unit has a company ID for identifying a company, a base station ID for identifying a base station, and a screen ID for identifying the display unit which are for the communication terminal to identify the display unit; the second unit has test information for optimally selecting the segment of the display unit, the control information for creating the test information, and an error detection code for detecting an error in the control information; the third unit has a frame type for identifying whether a frame is the control information or the data information, a frame length indicating a length of information, a sequence number indicating an order of information, the data information from the display unit to the communication terminal, and the error detection code for the error detection of the data information; and an existing downlink and uplink interface for communication is provided as the communication unit for performing communication between the display unit and the communication terminal, and a control channel for performing communication control for the communication is provided to complement a communication amount to the communication terminal of the communication system by using, for data transmission, information of the hue and the luminance of the display unit.

2. The communication system according to claim 1, wherein as the first unit, a two-dimensional code or a digital watermark on a single or a plurality of spaces in which the company ID, the base station ID, and the screen ID for the communication terminal to identify the display unit are embedded is displayed on the display unit at a specific time of the segment of a specific place or displayed on the display unit in a state of being superimposed on the video information, to be used as a two-dimensional pilot symbol for establishment of communication.

3. The communication system according to claim 2, wherein as the first unit, the company ID, the base station ID, and the screen ID for the communication terminal to identify the display unit are sent as a control frame including a serial bit string together with a preamble for synchronization and identification in a state of being superimposed on the video information for establishment of communication.

4. The communication system according to claim 2, wherein as the second unit, a test pattern including a two-dimensional image on a single or a plurality of spaces in which the hue and/or the luminance of each segment are changed in order to select the segment to be used for communication from the display unit to the communication terminal is sent as the test information to the display unit at specific time intervals in a state of being superimposed on the video information; and when the two-dimensional pilot symbol based on the two-dimensional code or the digital watermark is used as the first unit, at a time other than a specific time of sending the two-dimensional pilot symbol at a specific place of the segment where the two-dimensional pilot symbol is displayed, the test pattern is sent as the test information in a state of being superimposed on the video information.

5. The communication system according to claim 1, wherein in a system in which, as the second unit, a test pattern including a two-dimensional image on a single or a plurality of spaces in which the hue and/or the luminance of each segment are changed in order to select the segment to be used for communication from the display unit to the communication terminal is sent as the test information to the display unit at specific time intervals in a state of being superimposed on the video information, the test pattern of the two-dimensional image is sent to the display unit to be orthogonal or quasi-orthogonal to each segment.

6. The communication system according to claim 2, wherein as the second unit, the test information of a segment of a test pattern including a two-dimensional image on a single or a plurality of spaces in which the hue and/or the luminance of each segment are changed in order to select the segment to be used for communication from the display unit to the communication terminal is sent as a frame on a time axis as a data stream, and thus the frame type for identifying whether the frame includes the control information or the data information, the frame length indicating a length of information, a segment ID indicating a position of the segment, a resolution index capable of resolution, and the error detection code for error detection of a control frame are sent as the test information to the display unit at specific time intervals in a state of being superimposed on the video information; and when the two-dimensional pilot symbol based on the two-dimensional code or the digital watermark is used as the first unit, at a time other than a specific time of sending the two-dimensional pilot symbol at a specific place of the segment where the two-dimensional pilot symbol is displayed, the test information is sent as a frame including a bit string to the segment of the display unit.

7. The communication system according to claim 2, wherein when the two-dimensional pilot symbol based on the two-dimensional code or the digital watermark is not used as the first unit, as the data information of the third unit, in addition to the video information of the segment, a bit string including a preamble for synchronization and identification, the frame type for identifying whether the frame is the control information or the data information, the frame length indicating a length of information, the sequence number indicating an order of information, the data information from the display unit to the communication terminal, and the error detection code for detecting a frame error is sent to the display unit to spatially spread to one segment or one or more segments of the display unit.

8. The communication system according to claim 7, wherein when the two-dimensional pilot symbol based on the two-dimensional code or the digital watermark is used as the first unit, as the data information of the third unit, at a time other than a specific time of sending the two-dimensional pilot symbol of a specific place of the segment where the two-dimensional pilot symbol is displayed or to the video information of the segment other than a specific place used in the first unit, a bit string including the frame type for identifying whether the frame is the control information or the data information, the frame length indicating a length of information, the sequence number indicating an order of information, the data information from the display unit to the communication terminal, and the error detection code for detecting the frame error is sent to the display unit to spatially spread to one segment or one or more segments of the display unit.

9. The communication system according to claim 2, wherein the communication terminal is configured to perform autofocus (AF)-focus processing and zoom processing on the video displayed on the display unit, then transmit the captured image data to the image processing server, receive a result report of detection processing of the two-dimensional pilot symbol performed in the image processing server, perform synchronization processing of a time axis having, as a reference point of the time axis, a time when the two-dimensional pilot symbol is imaged, and then report it by using the communication unit to the display control device; the display control device is configured to perform adaptation processing of changing a size of the two-dimensional pilot symbol from a result of the report; first training processing by the display control device is provided in which when the two-dimensional pilot symbol has been received, an attach request is sent from the communication terminal, and as a result, attach to the communication terminal succeeds to request transmission of a detection pilot list; and second training processing is provided in which when the two-dimensional pilot symbol has been received, a list of the two-dimensional pilot symbols decoded by the communication terminal is sent, and a rate of a transmission stream is decided, an allocation of segments is decided, an encoding rate of an error correction code of data is decided on a basis of the list to generate and transmit a test stream, the communication terminal captures an image of this and transmits the image data to the image processing server, the data is decoded by the image processing server, a segment ID indicating a position of the segment that is receivable is specified, a bit error rate of a bit string including the error correction code is calculated to transmit a result thereof to the communication terminal, a reception result thereof is reported from the communication terminal to the display control device, and on a basis of this, decision of a rate of the transmission stream, decision of an allocation of the segments to be used, and decision of the encoding rate of the error correction code of supplemental downlink data are performed again to generate/transmit the test stream again.

10. The communication system according to claim 9, wherein the communication terminal has a function of the AF-focusing processing, the zoom processing, and a distortion correction of a captured image of the display unit and has a function of detecting a control frame from the captured image data, performing the synchronization processing of a time axis having, as a reference point of the time axis, the frame, and reporting a result thereof by using the communication unit with the display control device, and the display control device is configured to perform the adaptation processing of changing a size of the segment using a same frame on a basis of a result of the report; the first training processing by the display control device is provided in which when the control frame has been received, the attach request is sent from the communication terminal, and as a result, attach to the communication terminal succeeds to request transmission of a detection segment list; and the second training processing is provided which has a function in which when the control frame has been received, a list of the segments decoded by the communication terminal is sent, a rate of the transmission stream is decided, an allocation of the segments is decided, and a detection code rate of the error correction code of data is decided on a basis of the list, a test pattern is generated and transmitted which includes a two-dimensional image on a single or a plurality of spaces in which the hue and/or the luminance of each segment are changed in order to select the segment to be used for communication from the display unit to the communication terminal and in which a reception result of the test pattern is reported from the communication terminal, and decision of the rate, decision of an allocation of the segments, and on a basis of this, decision of the encoding rate of the error correction code of data are performed again to generate/transmit the test pattern again.

11. The communication system according to claim 1, wherein the display control device has a function of sending the frame having a same data to the segment in which a single or a plurality of pixels are collected; when an error is detected in a control frame or a data frame from the segment in an region imaged by the communication terminal, the communication terminal has a function of transmitting a detection segment list on a basis of an error detection result by the communication unit with the display control device, and the display control device is configured to execute communication processing by specifying a communicable segment on a basis of the detection segment list or by a reallocation function of changing the number of segments to be used by a threshold value on a basis of the set detection segment list.

12. The communication system according to claim 1, wherein single light source illumination is used as the display unit.

13. The communication system according to claim 1, wherein the display control device has an interface to a plurality of display units, each of which being the display unit, and has a function of mapping optical supplemental downlink data to the plurality of display units and sending the optical supplemental downlink data in a state of being superimposed on the video information, and the communication terminal has a function of recognizing the screen ID and is configured to decode data from the plurality of display units.

14. The communication system according to claim 2, wherein the display control device has a function of embedding a two-dimensional pilot symbol ID indicating a position of the two-dimensional pilot symbol in the two-dimensional pilot symbol, the communication terminal has a unit of specifying a position of the two-dimensional pilot symbol decoded from the two-dimensional pilot symbol ID, and only a specific region near the two-dimensional pilot symbol ID having been decoded is used for transmission of a control frame and a data frame.

15. The communication system according to claim 1, wherein the communication terminal and the display control device include a generation unit of a code synchronized with a control frame and a data frame having a rate higher than a data rate of optical supplemental downlink data, the display control device includes a unit for spreading a data stream of the control frame and the data frame by a code generated by the code generation unit, the data having been spread is superimposed on the video information, and the communication terminal obtains a processing gain of communication data by performing inverse spread on a basis of the code generated by the code generation unit of an encoder in the communication terminal.

16. The communication system according to claim 1, wherein the communication terminal is configured to store metadata including a compression technology of a source of a video displayed on the display unit and source data of the video, the metadata and the source data being sent in advance by another unit, and a video source is restored from the metadata of the video and the source data of the video stored from data obtained by capturing the video displayed on the display unit, and only optical supplemental downlink data superimposed on the video information of the display unit is extracted by subtraction processing of the source information from data received by the communication terminal.

17. The communication system according to claim 1, further comprising: an encoding method selection unit configured to decide an encoding method on a basis of an error rate reported from the communication terminal by another unit; and an encoding unit configured to create, according to this, a super frame by combining the frames for each segment including a forward error correction code from optical supplemental downlink data, wherein a transport block to be transmitted in each segment of the display unit is generated from the super frame based on a hash table generated on a basis of a hash function from an encoding method, and a data frame for each segment is created.

* * * * *